United States Patent
Ahn et al.

(10) Patent No.: US 12,127,248 B2
(45) Date of Patent: *Oct. 22, 2024

(54) WIRELESS COMMUNICATION METHOD AND WIRELESS COMMUNICATION TERMINAL USING MULTIPLE CHANNELS

(71) Applicants: WILUS INSTITUTE OF STANDARDS AND TECHNOLOGY INC., Gyeonggi-do (KR); SK TELECOM CO., LTD., Seoul (KR)

(72) Inventors: Jinsoo Ahn, Seoul (KR); Yongho Kim, Incheon (KR); Jinsam Kwak, Gyeonggi-do (KR); Juhyung Son, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/134,530

(22) Filed: Apr. 13, 2023

(65) Prior Publication Data

US 2023/0300880 A1 Sep. 21, 2023

Related U.S. Application Data

(63) Continuation of application No. 17/321,435, filed on May 15, 2021, now Pat. No. 11,659,591, which is a
(Continued)

(30) Foreign Application Priority Data

Feb. 10, 2015 (KR) .................. 10-2015-0020524
Feb. 13, 2015 (KR) .................. 10-2015-0022340

(51) Int. Cl.
*H04W 72/04* (2023.01)
*H04W 72/0446* (2023.01)
(Continued)

(52) U.S. Cl.
CPC ....... *H04W 74/08* (2013.01); *H04W 72/0446* (2013.01); *H04W 84/12* (2013.01); *H04W 74/0808* (2013.01); *H04W 88/02* (2013.01)

(58) Field of Classification Search
CPC . H04W 72/04; H04W 72/0446; H04W 74/08; H04W 74/0808; H04W 74/0816;
(Continued)

(56) References Cited

U.S. PATENT DOCUMENTS 7,701,962 B2 4/2010 Utsunomiya et al.
8,531,980 B2 9/2013 Park et al.
(Continued)

FOREIGN PATENT DOCUMENTS

KR 10-2010-0065355 6/2010
KR 10-2011-0064800 6/2011
(Continued)

OTHER PUBLICATIONS

Ahn et al, Efficient Wider Bandwidth Operation, IEEE802.11-13/1058r0, 11 pages, Nov. 2014.*
(Continued)

*Primary Examiner* — Frank Duong
(74) *Attorney, Agent, or Firm* — WOMBLE BOND DICKINSON (US) LLP

(57) ABSTRACT

Provided is a wireless communication terminal. The wireless communication terminal includes a transceiver and a processor. The processer performs a contention procedure based on a back-off counter, in each of a plurality of channel
(Continued)

and accesses, by using the transceiver, at least one of the plurality of channels based on the contention procedure.

13 Claims, 27 Drawing Sheets

Related U.S. Application Data continuation of application No. 16/528,546, filed on Jul. 31, 2019, now Pat. No. 11,039,473, which is a continuation of application No. 15/673,366, filed on Aug. 9, 2017, now Pat. No. 10,440,745, which is a continuation of application No. PCT/KR2016/001391, filed on Feb. 11, 2016.

(51) Int. Cl.
*H04W 74/08* (2009.01)
*H04W 84/12* (2009.01)
*H04W 74/0808* (2024.01)
*H04W 88/02* (2009.01)

(58) Field of Classification Search
CPC ......... H04W 74/0825; H04W 74/0833; H04W 74/0841; H04W 84/12; H04W 88/02
See application file for complete search history.

(56) References Cited

U.S. PATENT DOCUMENTS

| | | | |
|---|---|---|---|
| 8,687,572 | B2 | 4/2014 | Park |
| 8,730,905 | B2 | 5/2014 | Kneckt et al. |
| 8,971,273 | B2 | 3/2015 | Chan et al. |
| 9,119,110 | B2 | 8/2015 | Merlin et al. |
| 9,215,055 | B2 | 12/2015 | Chu et al. |
| 9,380,602 | B2* | 6/2016 | Park .................. H04W 72/20 |
| 9,698,947 | B2 | 7/2017 | Kwon et al. |
| 9,712,342 | B2 | 7/2017 | Yu et al. |
| 9,749,024 | B2 | 8/2017 | Huang et al. |
| 10,201,019 | B2* | 2/2019 | Kim .................. H04W 74/0833 |
| 10,602,510 | B2* | 3/2020 | Park .................. H04L 5/0094 |
| 2012/0082040 | A1 | 4/2012 | Gong et al. |
| 2012/0177017 | A1 | 7/2012 | Gong et al. |
| 2012/0213204 | A1 | 8/2012 | Noh et al. |
| 2014/0092860 | A1 | 4/2014 | Kneckt et al. |
| 2014/0369303 | A1 | 12/2014 | Gong et al. |
| 2016/0157264 | A1 | 6/2016 | Wang et al. |
| 2017/0367117 | A1 | 12/2017 | Ahn et al. |
| 2019/0357251 | A1 | 11/2019 | Ahn et al. |
| 2021/0274548 | A1 | 9/2021 | Ahn et al. |

FOREIGN PATENT DOCUMENTS

| | | |
|---|---|---|
| KR | 10-2012-0071144 | 7/2012 |
| KR | 10-2015-0005093 | 1/2015 |
| WO | 2014/061992 | 4/2014 |
| WO | 2016/129932 | 8/2016 |

OTHER PUBLICATIONS

International Search Report for PCT/KR2016/001391 mailed on May 30, 2016 and its English translation from WIPO (published as WO 2016/129932).
Written Opinion of the International Searching Authority for PCT/KR2016/001391 mailed on May 30, 2016 and its English translation from WIPO (published as WO 2016/129932).
International Preliminary Report on Patentability (Chapter I) for PCT/KR2016/001391 issued on Aug. 15, 2017 and its English translation from WIPO (published as WO 2016/129932).
Ahn et al. "Efficient Wider Bandwidth Operation in IEEE 802.11ax", doc.: IEEE 802.11-14/1437r1, Nov. 4, 2014, slides 1-19.
Ahn et al. "A Novel Channel Access Scheme in the Next Generation WLAN", Journal of Engineering and Applied Sciences 12 (Special Issue 4); 6660-6665, 2017; ISSN: 1816-949X; Medwell Journals, 2017, pp. 1-6.
Notice of Allowance for U.S. Appl. No. 15/673,366 dated May 20, 2019 (now published as US 2017/0367117).
Non-Final Office Action for U.S. Appl. No. 15/673,366 dated Dec. 6, 2018 (now published as US 2017/0367117).
Notice of Allowance for U.S. Appl. No. 16/528,546 dated Feb. 18, 2021 (now published as US 2019/0357251).
Office Action for U.S. Appl. No. 16/528,546 dated Sep. 16, 2020 (now published as US 2019/0357251).
Kwon et al.: "Issues on UL-OFDMA Transmission", IEEE 802.11-14/1431r0, Sep. 2014, pp. 1-19.
Ahn et al.: "DL-OFDMA Procedure in IEEE 802.11ax", IEEE 802.11-15/0092r1, Jan. 2015, pp. 1-22.
Notice of Allowance for U.S. Appl. No. 17/321,435 dated Feb. 10, 2023 (now published as US 2021/0274548).
Office Action for U.S. Appl. No. 17/321,435 dated Sep. 8, 2022 (now published as US 2021/0274548).

* cited by examiner

WIRELESS COMMUNICATION METHOD AND WIRELESS COMMUNICATION TERMINAL USING MULTIPLE CHANNELS

CROSS-REFERENCE TO RELATED APPLICATIONS

This application is a continuation of U.S. patent application Ser. No. 17/321,435 filed on May 15, 2021, which is a continuation of U.S. patent application Ser. No. 16/528,546 filed on Jul. 31, 2019, now issued as U.S. Pat. No. 11,039,473 dated Jun. 15, 2021, which is a continuation of U.S. patent application Ser. No. 15/673,366 filed on Aug. 9, 2017, issued as U.S. Pat. No. 10,440,745 dated Oct. 8, 2019, which is a continuation of International Patent Application No. PCT/KR2016/001391 filed on Feb. 11, 2016, which claims the priority to Korean Patent Application No. 10-2015-0020524 filed in the Korean Intellectual Property Office on Feb. 10, 2015, and Korean Patent Application No. 10-2015-0022340 filed in the Korean Intellectual Property Office on Feb. 13, 2015, the entire contents of which are incorporated herein by reference.

TECHNICAL FIELD

The present invention relates to a wireless communication method and a wireless communication terminal for setting a broadband link. Specifically, the present invention relates to a wireless communication method and a wireless communication terminal for increasing data communication efficiency by expanding a data transmission bandwidth of a terminal.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a radio interface accepted by 802.11n, such as a wider radio frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHZ, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

Especially, as the number of devices using a wireless communication technology increases, it is necessary to efficiently use a predetermined channel. Therefore, required is a technology capable of efficiently using bandwidths by simultaneously transmitting data between a plurality of terminals and base terminals.

DISCLOSURE

Technical Problem

An object of the present invention is to provide an efficient wireless communication method and wireless communication terminal.

Especially, an object of the present invention is to provide a wireless communication method and wireless communication terminal using a plurality of channels efficiently.

Technical Solution

According to an embodiment of the present invention, a wireless communication terminal includes: a transceiver configured to transmit/receive a wireless signal; and a processor configured to control an operation of the wireless communication terminal, wherein the transceiver performs a contention procedure in each of a plurality of channel and accesses at least one of the plurality of channels based on the contention procedure, wherein the contention procedure selects a random value within a contention window value and accesses a corresponding channel when a corresponding channel is idle by the selected random value.

At this time, the transceiver may apply a contention window of the same size to the contention procedure performed in each of the plurality of channels.

Specifically, the transceiver may apply the same random value to the contention procedure performed in each of the plurality of channels.

In addition, the plurality of channels may not be contiguous to each other.

In addition, the transceiver may perform the contention procedure in all channels available for the wireless communication terminal.

In addition, the plurality of channels may include a first channel and a second channel and the first channel and the second channel are contiguous to each other, wherein the transceiver may access the first channel through the contention procedure, and access the second channel when the second channel is idle for a predetermined time or more.

At this time, the plurality of channels may further include a third channel contiguous to the second channel, wherein the transceiver may access the first channel through the contention procedure, and access the third channel when the second channel and the third channel are idle for a predetermined time or more.

In addition, the plurality of channels may be some of channels available for the wireless communication terminal.

In addition, the transceiver may transmit information indicating the number of the plurality of channels.

In addition, the transceiver may transmit information indicating locations of the plurality of channels.

In addition, the processor may allocate a frequency band and a transmission time section used for data transmission depending on a priority according to a type of data.

At this time, the processor may set a time section where the wireless communication terminal uses a wireless medium based on data having the highest priority among data transmitted by the transceiver.

In addition, the processor may set a time section where the wireless communication terminal uses a wireless medium based on a wireless communication terminal receiving data having the highest priority among data transmitted by the transceiver In addition, the transceiver may transmit first information indicating a frequency band allocated to each of a plurality of wireless communication terminals and second information indicating a time section where each of the plurality of wireless communication terminals receives data.

In addition, the transceiver may transmit data to each of the plurality of terminals, and retransmit data to a wireless communication terminal that does not transmit a reception completion frame among the plurality of terminals, wherein the reception completion frame may indicate that a wireless communication terminal transmitting a reception completion frame receives data completely.

In addition, the transceiver may transmit the first information and the second information through one frame.

According to another embodiment of the present invention, a wireless communication terminal includes: a transceiver configured to transmit/receive a wireless signal; and a processor configured to control an operation of the wireless communication terminal, wherein the transceiver receives data from another wireless communication terminal, wherein the other wireless communication terminal decodes a physical frame received through a plurality of channels performing a contention procedure, wherein the contention procedure selects a random value within a contention window value, and accesses a corresponding channel when a corresponding channel is idle by the selected random value.

At this time, the plurality of channels may be some of channels available for the other wireless communication terminal.

In addition, first information indicating a frequency band allocated to each of a plurality of wireless communication terminals and second information indicating a time section where each of the plurality of wireless communication terminals receives data may be received, wherein the processor may enter a sleep state based on the first information and the second information.

According to an embodiment of the present invention, an operation method of a wireless communication terminal includes: performing a contention procedure in each of a plurality of channels; and accessing at least one of the plurality of channels based on the contention procedure, wherein the contention procedure selects a random value within a contention window value, and accesses a corresponding channel when a corresponding channel is idle by the selected random value.

Advantageous Effects

One embodiment of the present invention provides an efficient wireless communication method and wireless communication terminal.

Especially, an embodiment of the present invention provides a wireless communication method and wireless communication terminal using a plurality of channels efficiently.

MODE FOR CARRYING OUT THE INVENTION

Figure 1:
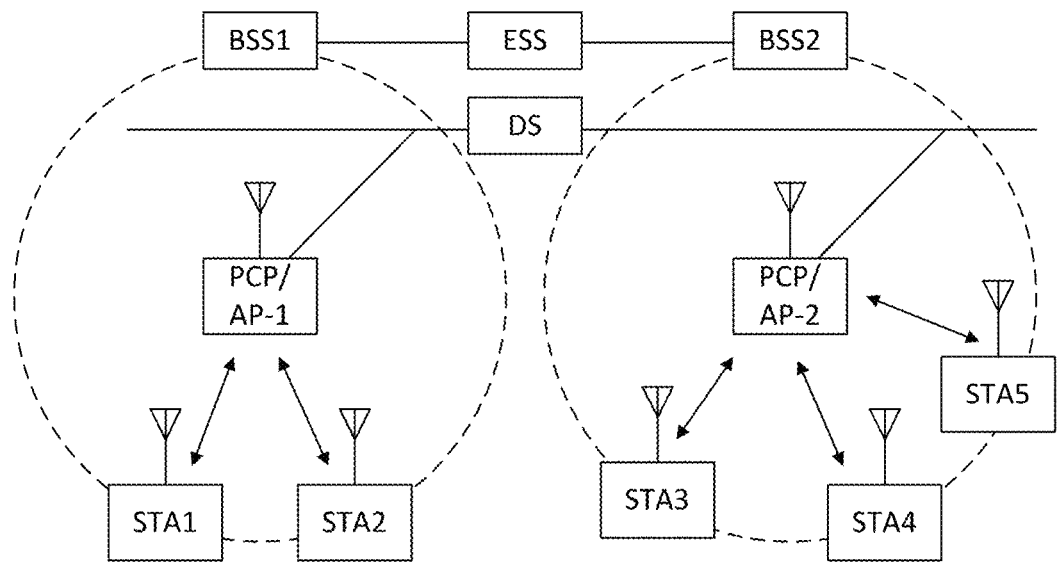
FIG. 1 is a view illustrating a wireless communication system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2015-0020524, and Nos. 10-2015-0022340 filed in the Korean Intellectual Property Office and the embodiments and mentioned items described in the respective applications are included in the Detailed Description of the present application.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA_d, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a radio medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
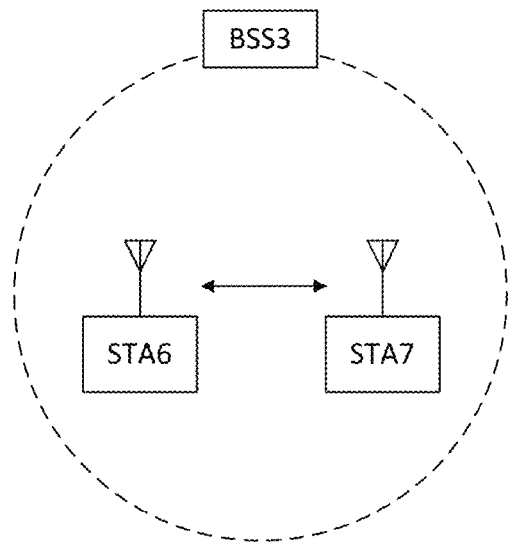
FIG. 2 is a view illustrating a wireless communication system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
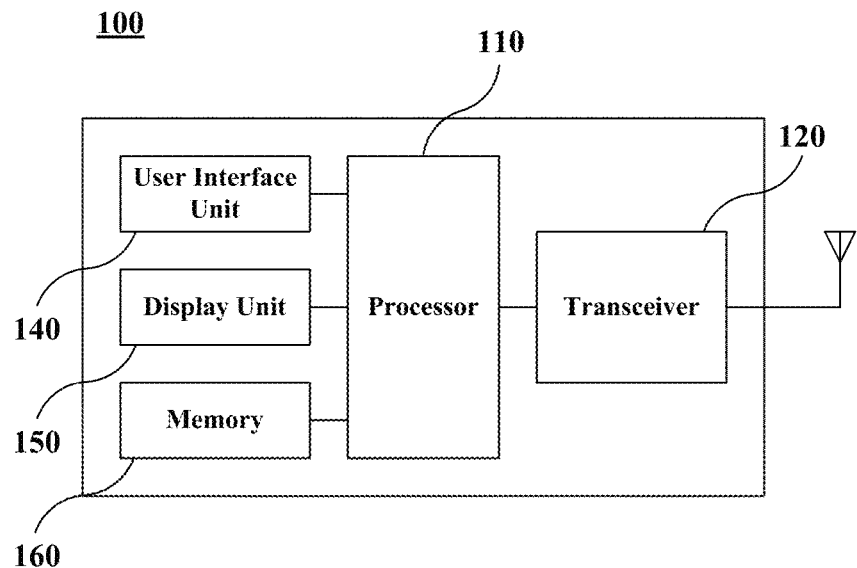
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a radio signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 controls various operations of radio signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
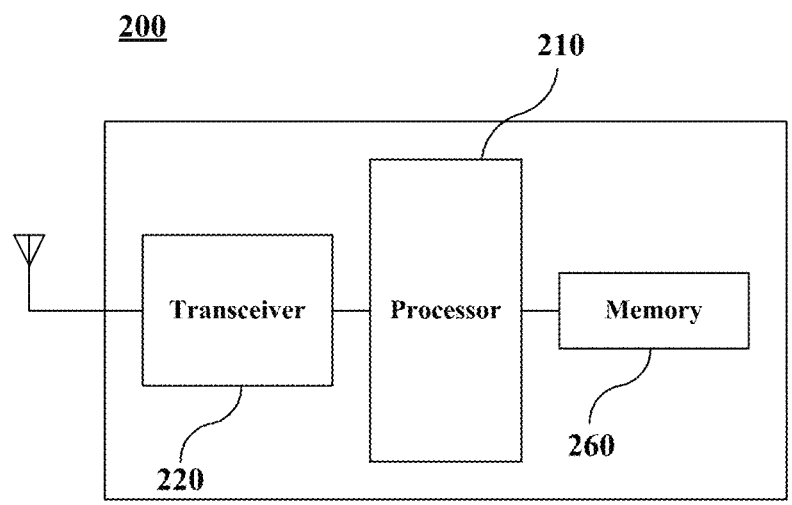
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHZ, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 controls various operations such as radio signal transmission/reception of the AP 200 according to the embodiment of the present invention. A detailed embodiment thereof will be described below.

Figure 5:
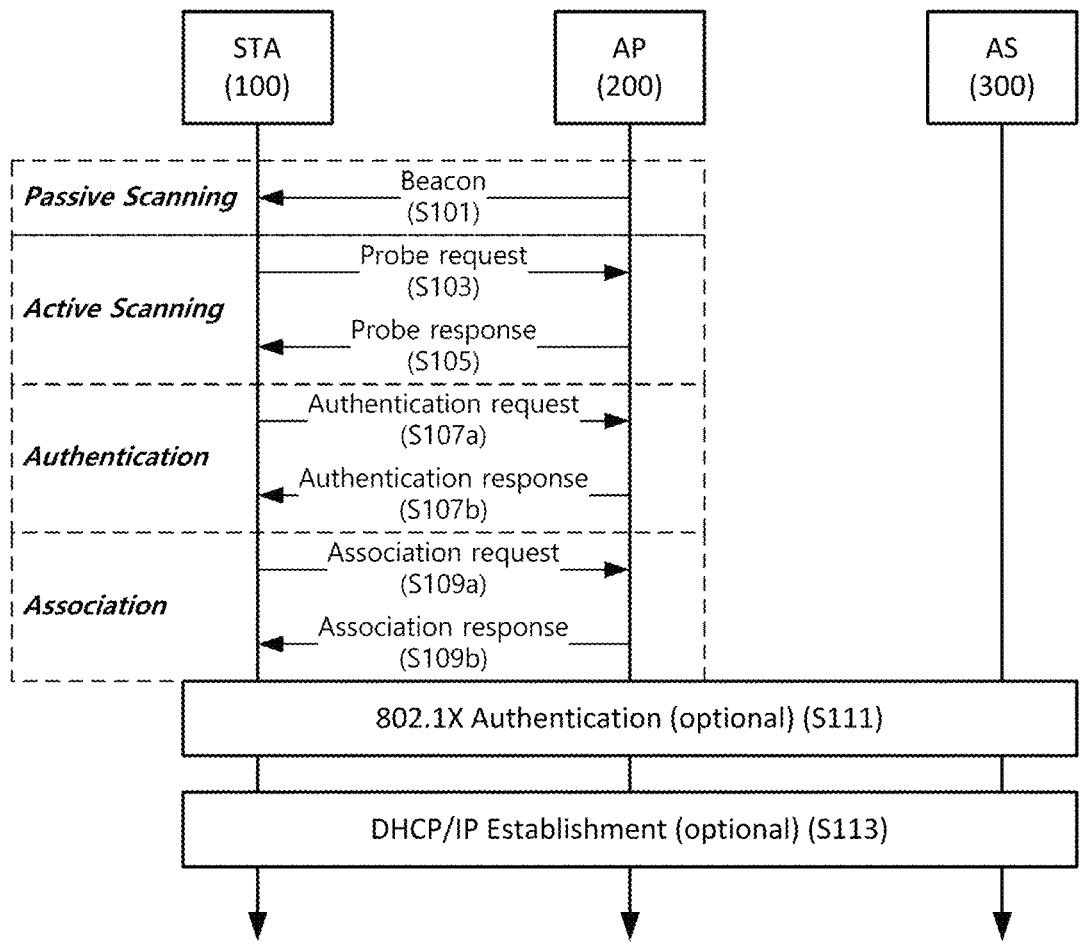
FIG. 5 is a view illustrating a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107*a*) and receiving an authentication response from the AP 200 (S107*b*). After the authentication step is performed, the STA 100 performs the association step by transmitting an association request (S109*a*) and receiving an association response from the AP 200 (S109*b*).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

When data is transmitted using Orthogonal Frequency Division Modulation (OFDMA) or Multi Input Multi Output (MIMO), any one wireless communication terminal may transmit data to a plurality of wireless communication terminals simultaneously. Also, any one wireless communication terminal may simultaneously receive data from a plurality of wireless communication terminals.

For convenience of description, any one wireless communication terminal that communicates simultaneously with a plurality of wireless communication terminals is referred to as a first wireless communication terminal and a plurality of wireless communication terminals that simultaneously communicate with the first wireless communication terminal are referred to as a plurality of second wireless communication terminals. In addition, the first wireless communication terminal may be referred to as a base wireless communication terminal. In addition, the first wireless communication terminal may be a wireless communication terminal that allocates a communication medium resource and performs scheduling in communication with a plurality of wireless communication terminals. Specifically, the first wireless communication terminal may perform the role of a cell coordinator. At this time, the first wireless communication terminal may be the access point 200. In addition, the second wireless communication terminal may be the station 100 associated with the access point 200. In a specific embodiment, the first wireless communication terminal may be a wireless communication terminal that allocates a communication medium resource and performs scheduling in an independent network, such as an ad-hoc network, which is not connected to an external distribution service. In addition, the first wireless communication terminal may be at least one of a base station, an eNB, and a transmission point TP.

The unlicensed band is a band that a wireless communication terminal can freely use without permission from the government. Accordingly, a plurality of wireless communication terminals using different wireless communication methods may simultaneously use the unlicensed band. Typical examples of the unlicensed band are the 5 GHz frequency band and the 2.4 GHz frequency band. Therefore, the wireless communication terminal must use the unlicensed band in consideration of the fairness with the wireless communication terminal using another communication method. For example, the 802.11 standard defines a channel access method of a wireless communication terminal based on a contention procedure. In the 802.11 standard, a wireless communication terminal randomly selects a value within a contention window (CW) size and accesses a corresponding channel if the channel is idle within a duration corresponding to the selected value. At this time, the value randomly selected within the CW size of the wireless communication terminal may be referred to as a back-off counter. Further, the size of the CW may be adjusted according to various conditions.

In addition, in the case of the 802.11 standard, a wireless communication terminal may expand a channel to a Secondary Channel based on a contention procedure for a Primary Channel. Specifically, the wireless communication terminal may use the Primary Channel according to the contention procedure, and use the Secondary Channel when the Secondary Channel contiguous to the Primary Channel is idle for a predetermined time. At this time, a frequency band that the wireless communication terminal can use in the BSS may be divided into a Primary Channel and a plurality of Secondary Channels. Specifically, the Primary Channel may indicate the frequency band that is the basis of the contention procedure in the BSS. In addition, the Primary Channel may have the same bandwidth as the unit frequency bandwidth. The Secondary Channel is the frequency band that separates the remaining frequency bands except the Primary Channel. The unit frequency bandwidth indicates the minimum value of the sum of a plurality of frequency bandwidths that the first wireless communication terminal allocates to the plurality of second wireless communication terminals, respectively. For example, when the unit frequency bandwidth is 20 MHz, the wireless communication terminal detects that the Primary Channel having a bandwidth of 20 MHz is idle during the back-off count. If the Primary Channel is idle during the back-off count and the 20 MHz Secondary Channel contiguous to the Primary Channel is idle during the PCF Inter-frame space (PIFS) defined by the 802.11 standard, the wireless communication terminal may access the frequency band having the 40 MHz frequency bandwidth. At this time, if the 40 MHz Secondary Channel contiguous to the 20 MHz Secondary Channel is also idle during the PIFS, the wireless communication terminal may access the frequency band having the 80 MHz frequency bandwidth. In addition, if the 120 MHz Secondary Channel contiguous to the 20 MHz Secondary Channel is also idle during the PIFS, the wireless communication terminal may access the frequency band having the 160 MHz frequency bandwidth.

However, when the wireless communication terminal operates in this manner, it can hinder the fairness with other wireless communication terminals that access the Secondary Channel through the contention procedure. Also, the wireless communication terminal may not use the idle Secondary Channel if the Secondary Channel that is not contiguous to the Primary Channel is idle and the Secondary Channel contiguous to the Primary Channel is not idle. Therefore, the above-described operation method may reduce the efficiency of frequency band utilization. Therefore, an efficient channel access method of the wireless communication terminal is needed. This will be described with reference to FIGS. 6 to 15.

Figure 6:
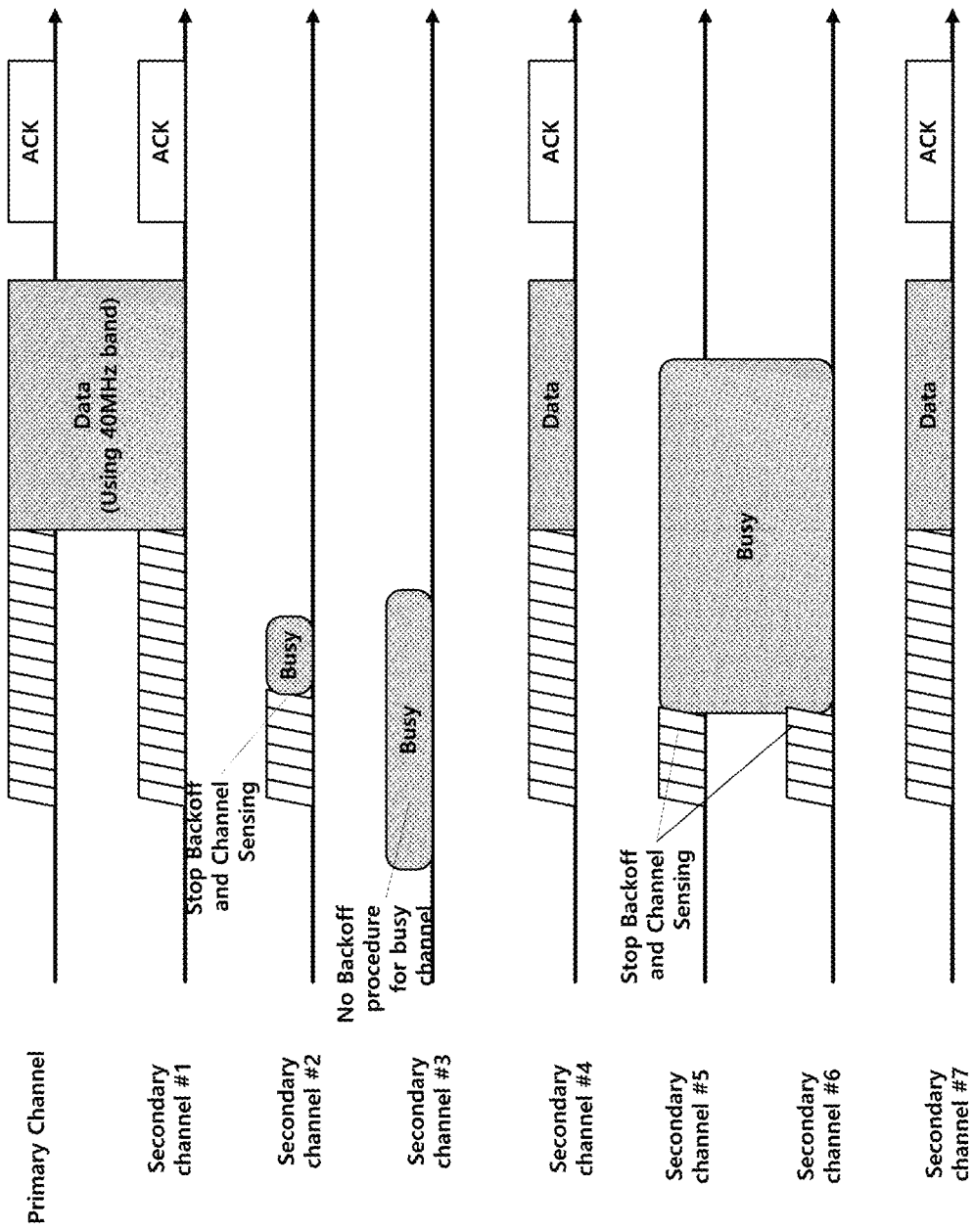
FIG. 6 is a view illustrating a method in which a wireless communication terminal independently accesses a plurality of channels according to an embodiment of the present invention.

FIG. 6 is a view illustrating a method in which a wireless communication terminal independently accesses a plurality of channels according to an embodiment of the present invention.

A wireless communication terminal according to an embodiment of the present invention performs a contention procedure in each of a plurality of channels. Specifically, a wireless communication terminal according to an embodiment of the present invention may select a random value within a CW size in each of a plurality of channels, and determine whether each of the plurality of channels is idle during the selected random value. At this time, a wireless communication terminal may apply the CW of the same size to a contention procedure performed in each of a plurality of channels. Specifically, the size of the CW may vary depending on the characteristics of a corresponding channel or the past contention result on a corresponding channel. Therefore, the wireless communication terminal may equally apply the largest CW size among the sizes of the plurality of CWs corresponding to the plurality of channels, respectively, to a contention procedure performed in the plurality of channels. In addition, the wireless communication terminal may apply the same random value a contention procedure performed in each of the plurality of channels. In another specific embodiment, the wireless communication terminal may independently select a random value in each of the plurality of channels, and may apply the independently selected random value to each of a plurality of contention procedures performed in the plurality of channels, respectively.

In the embodiment of FIG. 6, the wireless communication terminal independently performs a contention procedure in a Primary Channel and a first Secondary Channel Secondary channel #1 to a seventh Secondary Channel Secondary channel #7. Specifically, the wireless communication terminal selects one random value in the same CW. The wireless communication terminal determines whether the Primary Channel and the first Secondary Channel Secondary channel #1 to the seventh Secondary Channel Secondary channel #7 are idle during the selected random value. Since the Primary Channel, the first Secondary Channel Secondary channel #1, the fourth Secondary Channel Secondary channel #4, and the seventh Secondary Channel secondary cannel #7 are idle during a random value selected by the wireless communication terminal, the wireless communication terminal transmits data through the Primary Channel, the first Secondary Channel Secondary cannel #1, the fourth Secondary Channel Secondary cannel #4, and the seventh Secondary Channel Secondary cannel #7.

Figure 7:
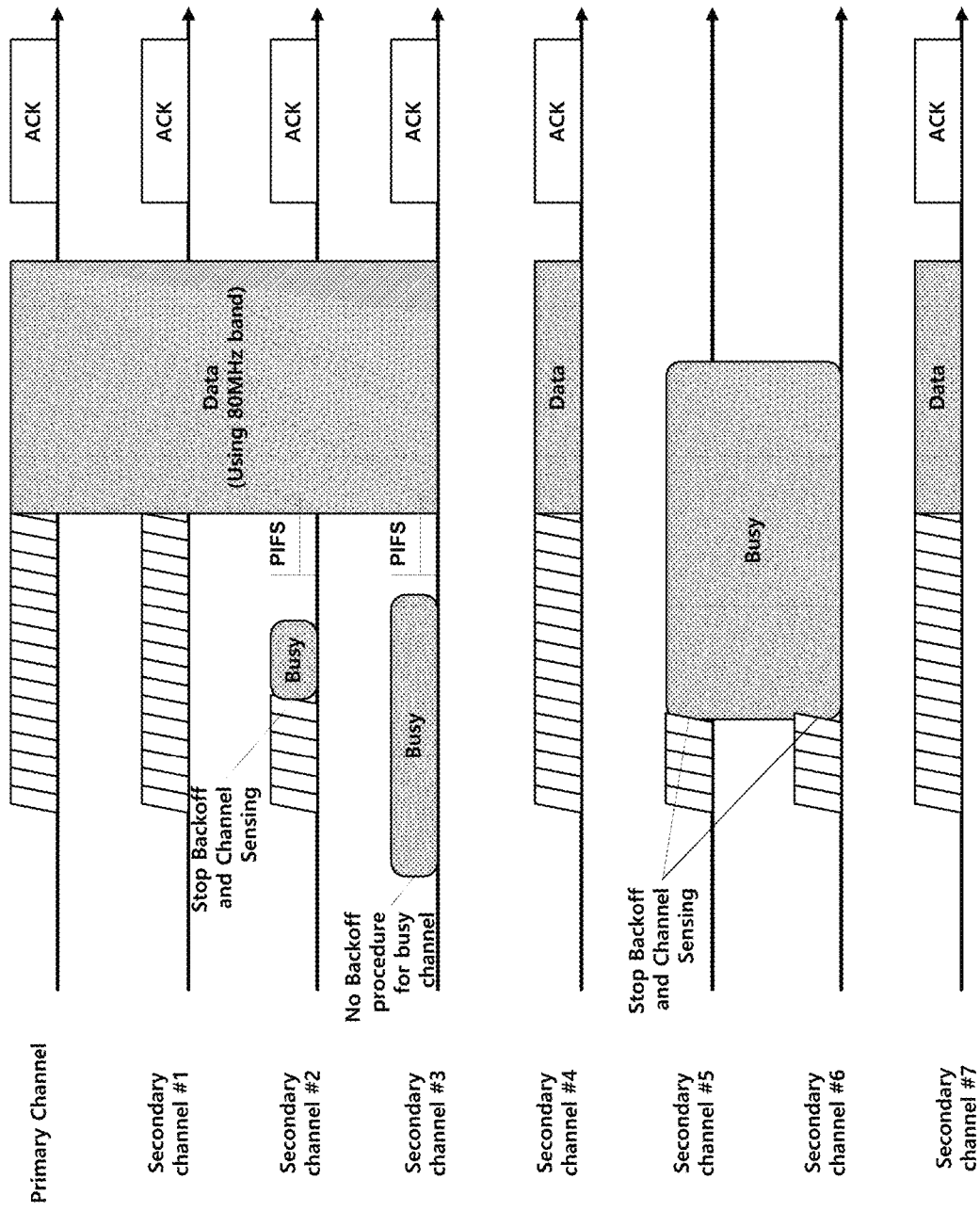
FIG. 7 is a view illustrating a method of a wireless communication terminal to access a plurality of channels in consideration of whether a channel is a channel accessible through a contention procedure or a contiguous channel according to an embodiment of the present invention.

FIG. 7 is a view illustrating a method of a wireless communication terminal to access a plurality of channels in consideration of whether a channel is a channel accessible through a contention procedure or a contiguous channel according to an embodiment of the present invention.

A wireless communication terminal according to an embodiment of the present invention may use the corresponding channel even if the Secondary Channel accessed through the contention procedure is not contiguous to the Primary Channel. Specifically, the wireless communication terminal may perform a contention procedure in each of a plurality of channels, and when a channel accessible through the contention procedure and a contiguous channel are idle for a predetermined time or more, access a corresponding channel irrespective of the contention procedure of the corresponding channel. For convenience of explanation, a channel accessible through a contention procedure is referred to as a first channel, a channel contiguous to the first channel is referred to as a second channel, and a channel contiguous to the second channel is referred to as a third channel. At this time, if the second channel is idle for a predetermined time and the third channel is also idle for a predetermined time, the wireless communication terminal may access the second channel and the third channel. At this time, a channel contiguous to a channel accessible through a contention procedure may represent a channel continuous to a channel accessible through a contention procedure. At this time, the predetermined time may be the PIFS defined in the 802.11 standard.

In the embodiment of FIG. 7, the wireless communication terminal independently performs a contention procedure in a Primary Channel and a first Secondary Channel Secondary channel #1 to a seventh Secondary Channel Secondary channel #7. Specifically, the wireless communication terminal selects one random value in the same CW. The wireless communication terminal determines whether the Primary Channel and the first Secondary Channel Secondary channel #1 to the seventh Secondary Channel Secondary channel #7 are idle during the selected random value. The Primary Channel, the first Secondary Channel Secondary channel #1, the fourth Secondary Channel Secondary channel #4, and the seventh Secondary Channel Secondary channel #7 are idle during the random value selected by the wireless communication terminal. In addition, the second Secondary Channel Secondary channel #2 contiguous to the first Secondary Channel Secondary channel #1 accessible by a wireless communication terminal through a contention procedure are idle for PIFS, and the third Secondary Channel Secondary channel #3 contiguous to the fourth Secondary Channel Secondary channel #4 accessible by a wireless communication terminal through a contention procedure are idle for PIFS. Accordingly, the wireless communication terminal transmits data through the Primary Channel, the first Secondary Channel Secondary channel #1 to the fourth Secondary Channel Secondary channel #4, and the seventh Secondary Channel Secondary channel #7.

In this case, the wireless communication terminal may use a frequency band greater than that in the embodiment of FIG. 6. However, it is possible to impair the fairness with other wireless communication terminals performing a contention procedure on a channel accessible through the contention procedure.

Figure 8:
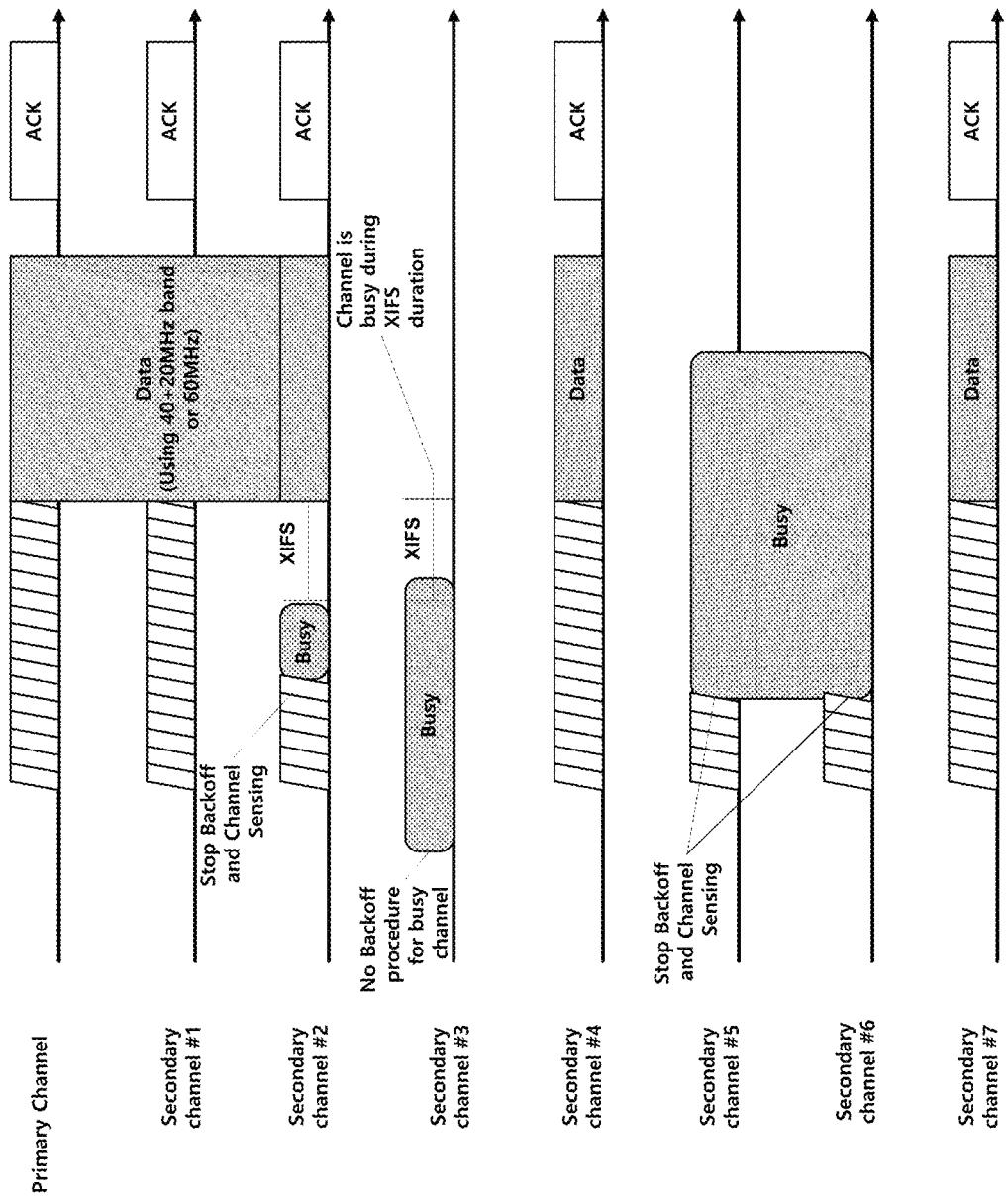
FIG. 8 is a view illustrating a method of a wireless communication terminal to access a plurality of channels in consideration of whether a channel is a channel accessible through a contention procedure or a contiguous channel when applying a time reference different from that of FIG. 7, according to an embodiment of the present invention.

FIG. 8 is a view illustrating a method of a wireless communication terminal to access a plurality of channels in consideration of whether a channel is a channel accessible through a contention procedure or a contiguous channel when applying a time reference different from that of FIG. 7, according to an embodiment of the present invention.

In the embodiment of FIG. 7, the wireless communication terminal may perform a contention procedure in each of a plurality of channels, and when a channel accessible through the contention procedure and a contiguous channel are idle for a predetermined time or more, access a corresponding channel irrespective of the contention procedure of the corresponding channel. At this time, the predetermined time may be the PIFS defined in the 802.11 standard. However, since the time of PIFS is not sufficiently long, it may damage the fairness with other wireless communication terminals. Thus, in a specific embodiment, the predetermined time may be x: inter-frame space (xIFS), which is a predetermined frame interval defined by the 802.11 standard.

In the embodiment of FIG. 8, the wireless communication terminal independently performs a contention procedure in a Primary Channel and a first Secondary Channel Secondary channel #1 to a seventh Secondary Channel Secondary channel #7. Specifically, the wireless communication terminal selects one random value in the same CW. The wireless communication terminal determines whether the Primary Channel and the first Secondary Channel Secondary channel #1 to the seventh Secondary Channel Secondary channel #7 are idle during the selected random value. The Primary Channel, the first Secondary Channel Secondary channel #1, the fourth Secondary Channel Secondary channel #4, and the seventh Secondary Channel Secondary channel #7 are idle during the random value selected by the wireless communication terminal. Also, the second Secondary Channel Secondary channel #2 contiguous to the first Secondary Channel Secondary channel #1 accessible by the wireless communication terminal through a contention procedure is idle during xIFS. However, since the third Secondary Channel Secondary channel #3 contiguous to the fourth Secondary Channel Secondary channel #4 accessible by the wireless communication terminal through a contention procedure is idle during a time shorter than xIFS, unlike the embodiment of FIG. 7, the wireless communication terminal may not access the third Secondary Channel Secondary channel #3. Accordingly, the wireless communication terminal transmits data through the Primary Channel, the first Secondary Channel Secondary channel #1 to the second Secondary Channel Secondary channel #2, the fourth Secondary Channel Secondary channel #4, and the seventh Secondary Channel Secondary channel #7.

The wireless communication terminal may transmit a transmission ready frame, which is a MAC frame indicating that it is ready for transmission before transmitting data. In addition, the wireless communication terminal may receive a reception ready frame, which is a MAC frame indicating that it is ready for reception from a terminal to receive data. In this case, the transmission ready frame may be a Request to Send (RTS) frame defined in the 802.11 standard. In addition, the reception ready frame may be a clear to send (CTS) frame defined in the 802.11 standard. In addition, the transmission ready frame and the reception ready frame indicate that a wireless communication terminal that transmits the transmission ready frame and a wireless communication terminal that transmits the reception ready frame use the corresponding channel to neighbor wireless communication terminals. Accordingly, another wireless communication terminal that detects a reception ready frame and a transmission ready frame sets a network allocation vector (NAV). Through this, a wireless communication terminal may prevent the collision of wireless signals due to a hidden node. Even when a wireless communication terminal transmits data based on a transmission ready frame and a reception frame, the contention procedure described above may be performed.

Figure 9:
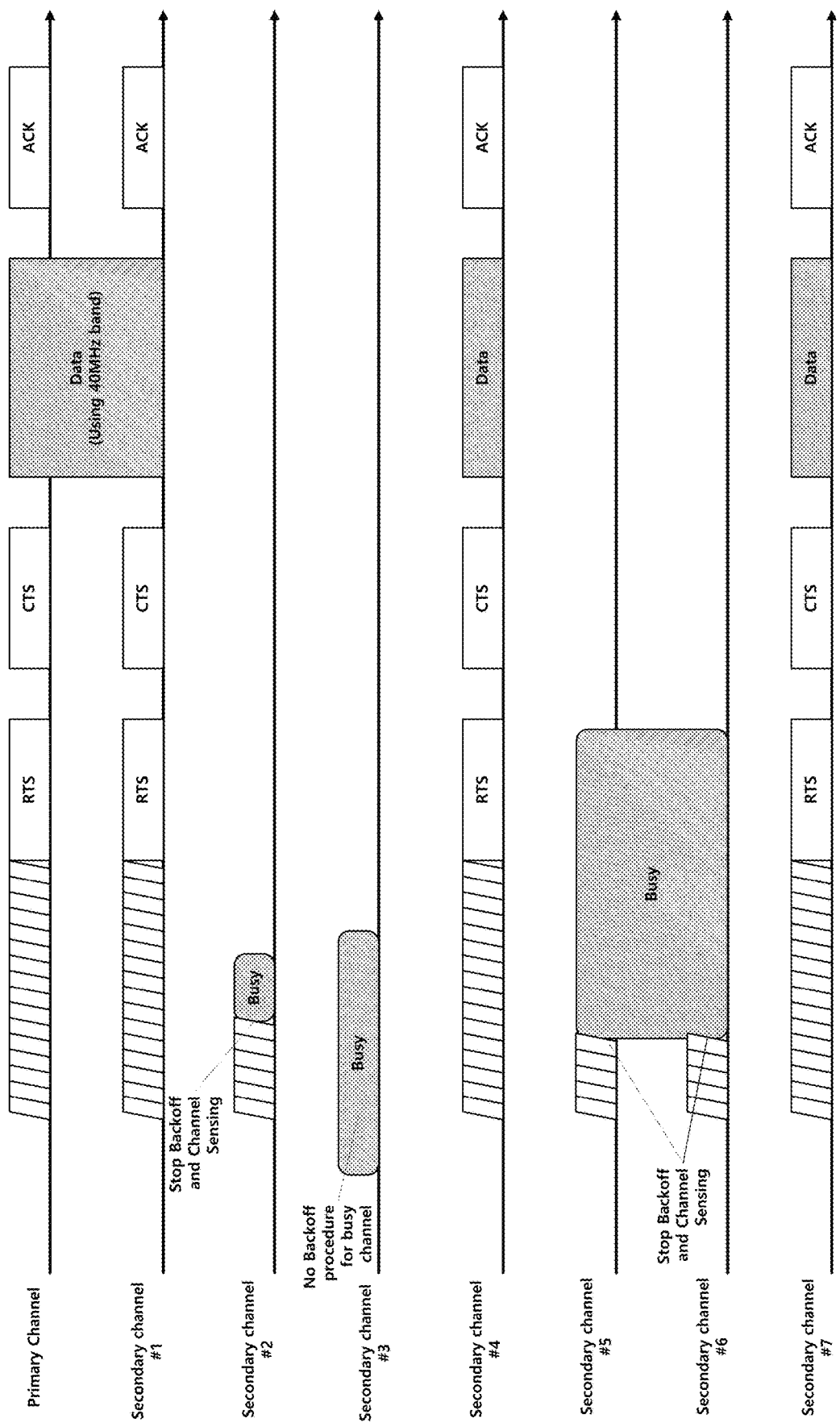
FIG. 9 is a view illustrating that when independently accessing a plurality of channels, a wireless communication terminal transmits an RTS frame and a CTS frame according to an embodiment of the present invention.

FIG. 9 is a view illustrating that when independently accessing a plurality of channels, a wireless communication terminal transmits an RTS frame and a CTS frame according to an embodiment of the present invention.

As described above, a wireless communication terminal according to an embodiment of the present invention performs a contention procedure in each of a plurality of channels. At this time, the wireless communication terminal may transmit the transmission ready frame after accessing the channel through the contention procedure in each of the plurality of channels. At this time, the wireless communication terminal may transmit data to another wireless communication terminal that transmits the reception ready frame in response to the transmission ready frame.

As described above, a wireless communication terminal according to an embodiment of the present invention may select a random value within a CW size in each of a plurality of channels, and determine whether each of the plurality of channels is idle during the selected random value. At this time, the size of a CW applied to the contention procedure performed in each of the plurality of channels may be the same. Specifically, the size of the CW may vary depending on the characteristics of a corresponding channel or the past contention result on a corresponding channel. Therefore, the wireless communication terminal may equally apply the largest CW size among the sizes of the plurality of CWs corresponding to the plurality of channels, respectively, to the plurality of channels. In addition, the wireless communication terminal may use the corresponding channel even if the Secondary Channel accessed through the contention procedure is not contiguous to the Primary Channel.

In the embodiment of FIG. 9, the wireless communication terminal independently performs a contention procedure in a Primary Channel and a first Secondary Channel Secondary channel #1 to a seventh Secondary Channel Secondary channel #7. Specifically, the wireless communication terminal selects one random value in the same CW. The wireless communication terminal determines whether the Primary Channel and the first Secondary Channel Secondary channel #1 to the seventh Secondary Channel Secondary channel #7 are idle during the selected random value. Since the Primary Channel, the first Secondary Channel Secondary channel #1, the fourth Secondary Channel Secondary channel #4, and the seventh Secondary Channel Secondary channel #7 are idle during a random value selected by the wireless communication terminal, the wireless communication terminal transmits the RTS frame through the Primary Channel, the first Secondary Channel Secondary channel #1, the fourth Secondary Channel Secondary channel #4, and the seventh Secondary Channel Secondary channel #7. The wireless communication terminal receives the CTS frame through the Primary Channel, the first Secondary Channel Secondary channel #1, the fourth Secondary Channel Secondary channel #4, and the seventh Secondary Channel Secondary channel #7. The wireless communication terminal transmits data to a wireless communication terminal that transmits the CTS frame through the Primary Channel, the first Secondary Channel Secondary channel #1, the fourth Secondary Channel Secondary channel #4, and the seventh Secondary Channel Secondary channel #7.

Figure 10:
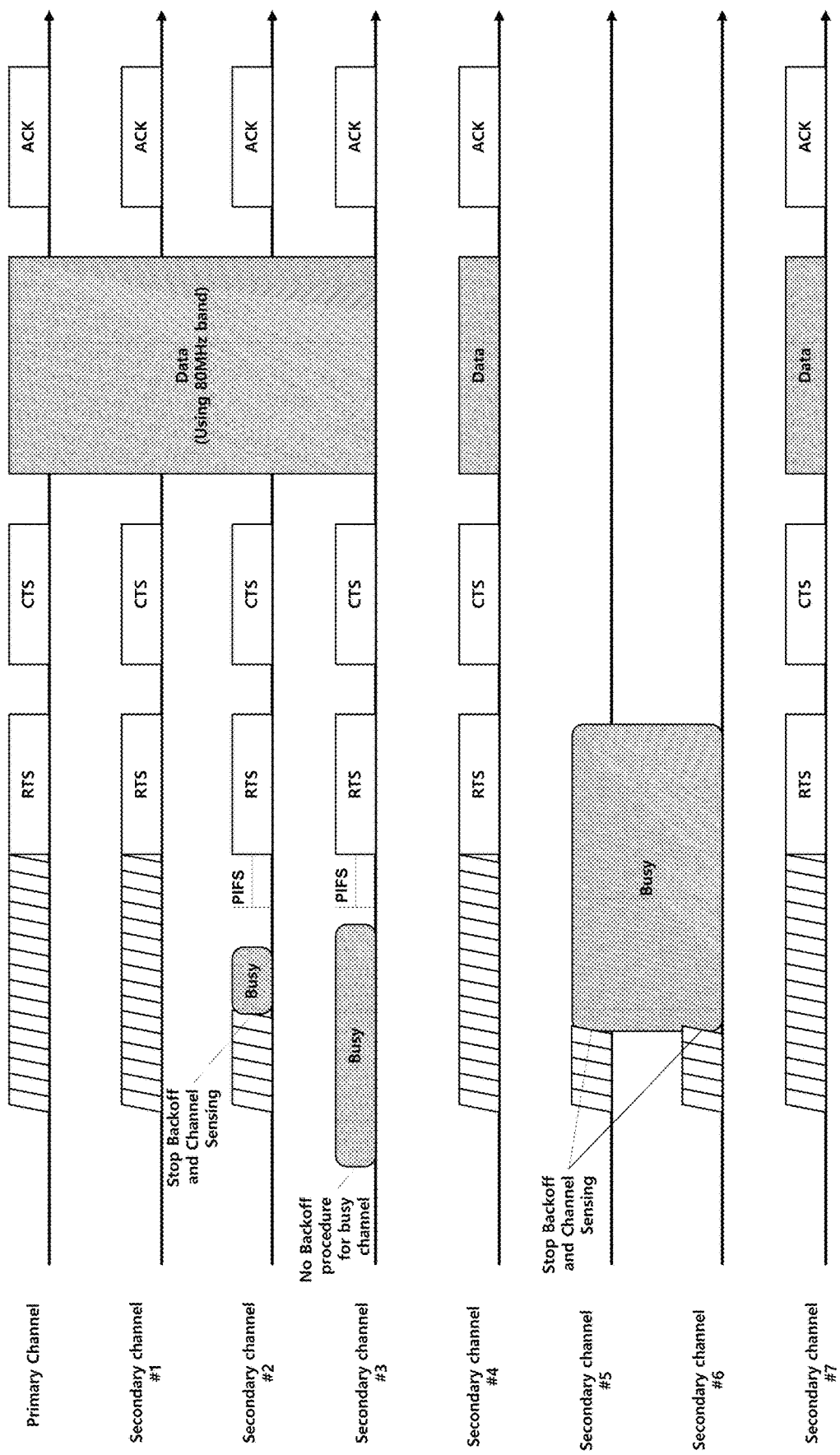
FIG. 10 is a view illustrating that a wireless communication terminal transmits an RTS frame and a CTS frame in consideration of whether a channel is a channel accessible through a contention procedure or a contiguous channel according to an embodiment of the present invention.

FIG. 10 is a view illustrating that a wireless communication terminal transmits an RTS frame and a CTS frame in consideration of whether a channel is a channel accessible through a contention procedure or a contiguous channel according to an embodiment of the present invention.

As described above, a wireless communication terminal according to an embodiment of the present invention may perform a contention procedure in each of a plurality of channels, and when a channel accessible through the contention procedure and a contiguous channel are idle for a predetermined time or more, access a corresponding channel irrespective of the contention procedure of the corresponding channel. Accordingly, when a channel accessible through the contention procedure and a contiguous channel are idle for a predetermined time or more, the wireless communication terminal may transmit a transmission ready frame to a corresponding channel irrespective of the contention procedure of the corresponding channel.

As described above, the wireless communication terminal may access a channel contiguous to a channel idle for a predetermined time or longer as a channel contiguous to a channel accessible through the contention procedure. At this time, the predetermined time may be the PIFS defined in the 802.11 standard.

In the embodiment of FIG. 10, the wireless communication terminal independently performs a contention procedure in a Primary Channel and a first Secondary Channel Secondary channel #1 to a seventh Secondary Channel Secondary channel #7. Specifically, the wireless communication terminal selects one random value in the same CW. The wireless communication terminal determines whether the Primary Channel and the first Secondary Channel Secondary channel #1 to the seventh Secondary Channel Secondary channel #7 are idle during the selected random value. The Primary Channel, the first Secondary Channel Secondary channel #1, the fourth Secondary Channel Secondary channel #4, and the seventh Secondary Channel Secondary channel #7 are idle during the random value selected by the wireless communication terminal. In addition, the second Secondary Channel Secondary channel #2 contiguous to the first Secondary Channel Secondary channel #1 accessible by a wireless communication terminal through a contention procedure are idle for PIFS, and the third Secondary Channel Secondary channel #3 contiguous to the fourth Secondary Channel Secondary channel #4 accessible by a wireless communication terminal through a contention procedure are idle for PIFS. Accordingly, the wireless communication terminal transmits an RTS frame through the Primary Channel, the first Secondary Channel Secondary channel #1 to the fourth Secondary Channel Secondary channel #4, and the seventh Secondary Channel Secondary channel #7. The wireless communication terminal receives the CTS frame through the Primary Channel, the first Secondary Channel Secondary channel #1 to the fourth Secondary Channel Secondary channel #4, and the seventh Secondary Channel Secondary channel #7. The wireless communication terminal transmits data to a wireless communication terminal that transmits the CTS frame through the Primary Channel, the first Secondary Channel Secondary channel #1 to the fourth Secondary Channel Secondary channel #4, and the seventh Secondary Channel Secondary channel #7.

Figure 11:
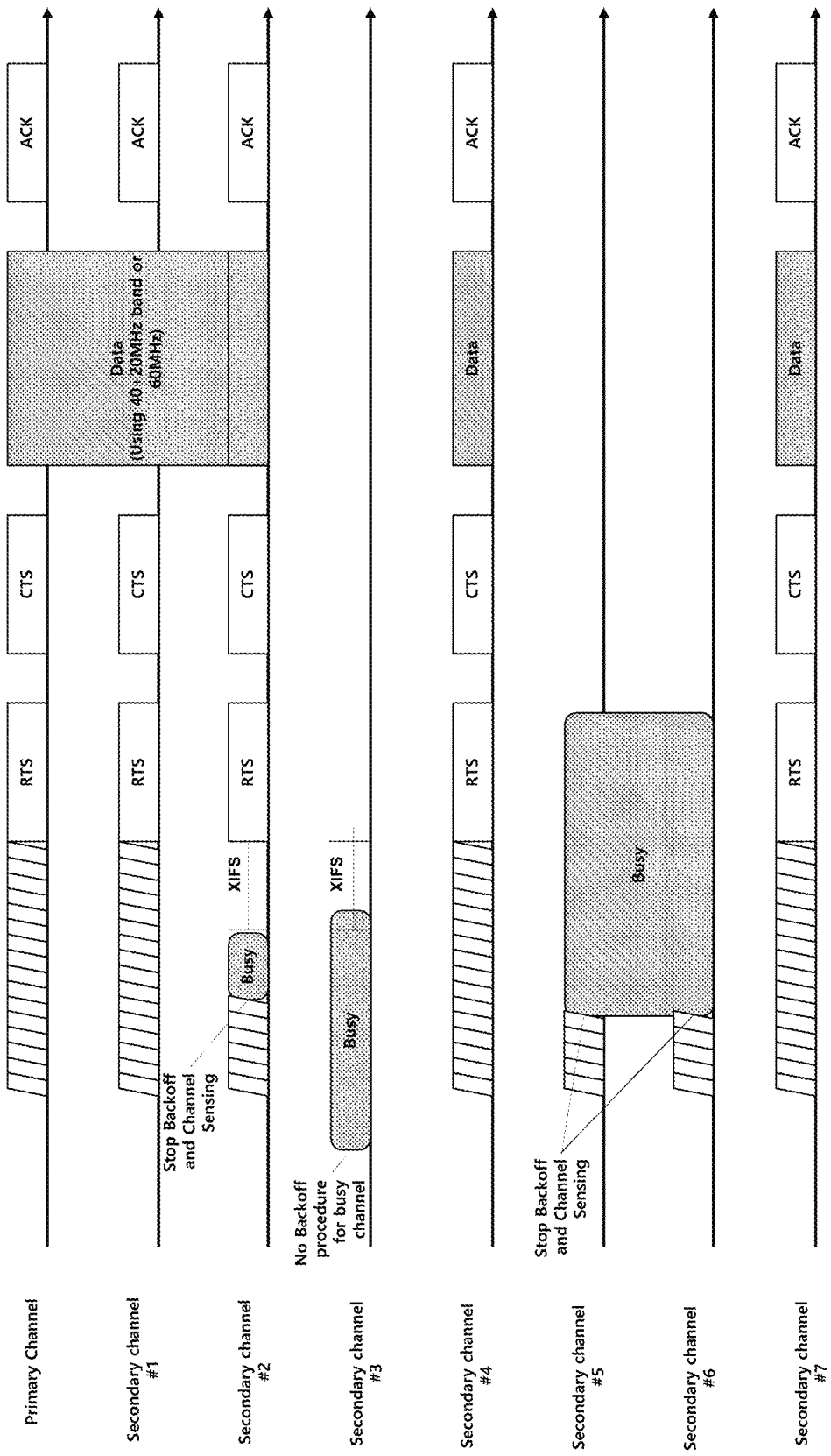
FIG. 11 is a view illustrating that a wireless communication terminal transmits an RTS frame and a CTS frame in consideration of whether a channel is a channel accessible through a contention procedure or a contiguous channel when applying a time reference different from that of FIG. 10, according to an embodiment of the present invention.

FIG. 11 is a view illustrating that a wireless communication terminal transmits an RTS frame and a CTS frame in consideration of whether a channel is a channel accessible through a contention procedure or a contiguous channel when applying a time reference different from that of FIG. 10, according to an embodiment of the present invention.

In the embodiment of FIG. 10, the wireless communication terminal may perform a contention procedure in each of a plurality of channels, and when a channel accessible through the contention procedure and a contiguous channel are idle for a predetermined time or more, access a corresponding channel irrespective of the contention procedure of the corresponding channel. At this time, the predetermined time may be the PIFS defined in the 802.11 standard. However, since the time of PIFS is not sufficiently long, it may damage the fairness with other wireless communication terminals. Thus, in a specific embodiment, the predetermined time may be x: inter-frame space (xIFS), which is a predetermined frame interval defined by the 802.11 standard.

In the embodiment of FIG. 11, the wireless communication terminal independently performs a contention procedure in a Primary Channel and a first Secondary Channel Secondary channel #1 to a seventh Secondary Channel Secondary channel #7. Specifically, the wireless communication terminal selects one random value in the same CW. The wireless communication terminal determines whether the Primary Channel and the first Secondary Channel Secondary channel #1 to the seventh Secondary Channel Secondary channel #7 are idle during the selected random value. The Primary Channel, the first Secondary Channel Secondary channel #1, the fourth Secondary Channel Secondary channel #4, and the seventh Secondary Channel Secondary channel #7 are idle during the random value selected by the wireless communication terminal. Also, the second Secondary Channel Secondary channel #2 contiguous to the first Secondary Channel Secondary channel #1 accessible by the wireless communication terminal through a contention procedure is idle during xIFS. However, since the third Secondary Channel Secondary channel #3 contiguous to the fourth Secondary Channel Secondary channel #4 accessible by the wireless communication terminal through a contention procedure is idle during a time shorter than xIFS, unlike the embodiment of FIG. 10, the wireless communication terminal may not access the third Secondary Channel Secondary channel #3. Accordingly, the wireless communication terminal transmits an RTS frame through the Primary Channel, the first Secondary Channel Secondary channel #1 to the second Secondary Channel Secondary channel #2, the fourth Secondary Channel Secondary channel #4, and the seventh Secondary Channel Secondary channel #7. The wireless communication terminal receives a CTS frame from the wireless communication terminal that receives the RTS frame through the Primary Channel, the first Secondary Channel Secondary channel #1 to the second Secondary Channel Secondary channel #2, the fourth Secondary Channel Secondary channel #4, and the seventh Secondary Channel Secondary channel #7. The wireless communication terminal transmits data to the wireless communication terminal that transmits the CTS frame through the Primary Channel, the first Secondary Channel Secondary channel #1 to the second Secondary Channel Secondary channel #2, the fourth Secondary Channel Secondary channel #4, and the seventh Secondary Channel Secondary channel #7.

As described above, when the contention procedure is independently performed in each of the plurality of channels, the amount of computation of the wireless communication terminal becomes large. Accordingly, this may hinder the operation of the wireless communication terminal. Therefore, the wireless communication terminal may perform a contention procedure only for a limited plurality of channels. Specifically, the wireless communication terminal may perform a contention procedure on the Primary Channel and one channel except for the Primary Channel. At this time, one channel except for the Primary Channel is referred to as an Alternate Primary Channel (APCH). However, a plurality of APCHs may exist in a specific embodiment. A method in which a wireless communication terminal uses the Primary Channel and the APCH will be described with reference to FIGS. 12 and 13.

Figure 12:
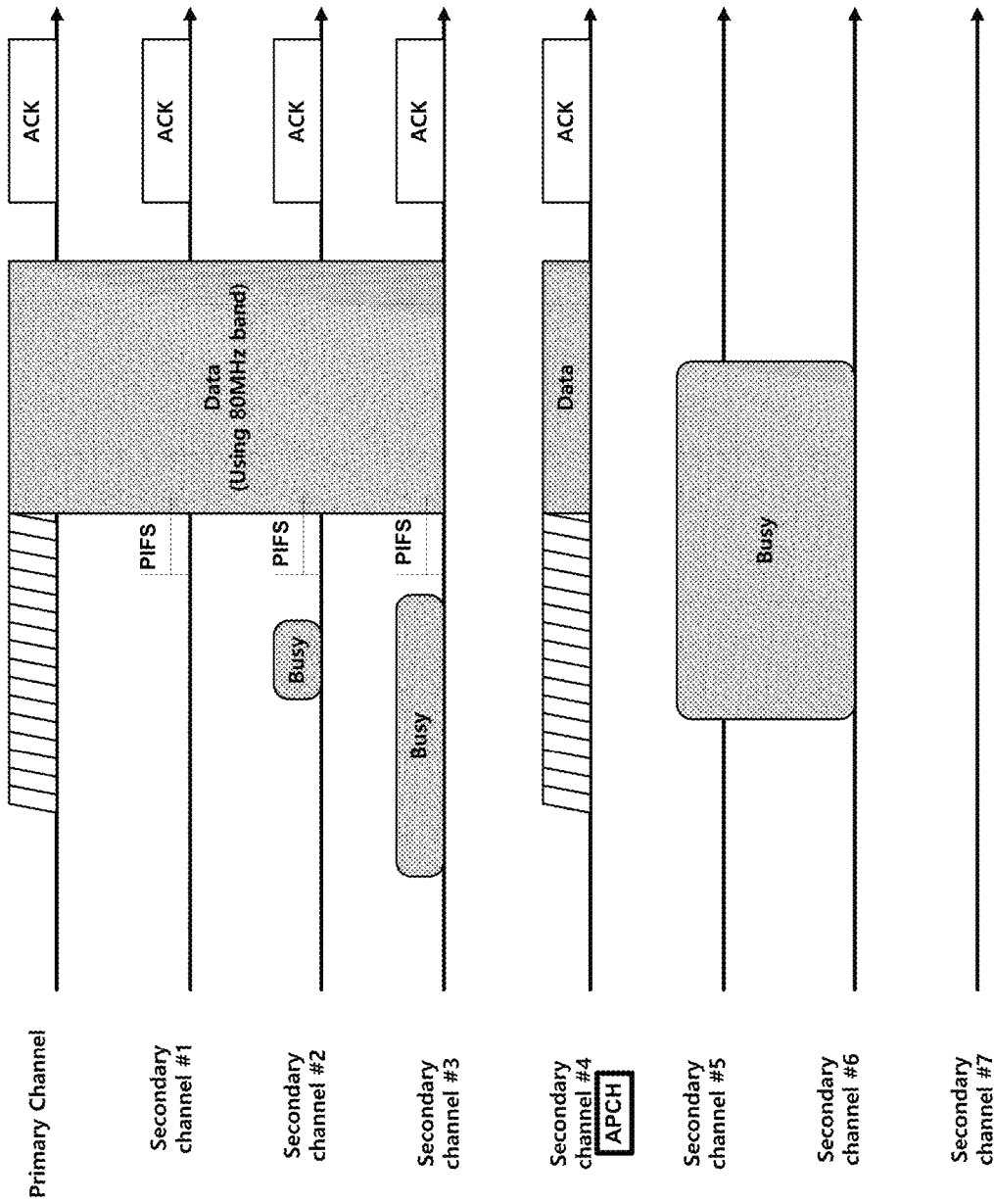
FIG. 12 is a view illustrating a method of a wireless communication terminal to access a channel using an APCH according to an embodiment of the present invention.

FIG. 12 is a view illustrating a method of a wireless communication terminal to access a channel using an APCH according to an embodiment of the present invention.

A wireless communication terminal according to an embodiment of the present invention performs a contention procedure in each of the Primary Channel and the APCH. Specifically, a wireless communication terminal according to an embodiment of the present invention may select a random value within a CW size in each of the Primary Channel and the APCH, and determine whether each of the Primary Channel and the APCH is idle during the selected random value. At this time, the size of the CW applied to the Primary Channel and the APCH may be the same. Specifically, the wireless communication terminal may apply the largest CW size among the plurality of CWs corresponding to the Primary Channel and the APCH to the Primary Channel and the APCH. In addition, the wireless communication terminal may apply the same random value to the Primary Channel and the APCH. In another specific embodiment, the wireless communication terminal may independently generate a random value in each of the Primary Channel and the APCH.

At this time, the APCH may not be contiguous to the Primary Channel. Specifically, the Primary Channel and the APCH may be separated by half the total bandwidth that the wireless communication terminal can use.

In addition, in a specific embodiment, the wireless communication terminal may access a channel contiguous to the Primary Channel when a channel accessible to the Primary Channel through a contention procedure and contiguous to the Primary Channel is idle for a predetermined time. For convenience of description, a channel contiguous to the Primary Channel is referred to as a first channel, and a channel contiguous to the first channel is referred to as a second channel. In addition, if the Primary Channel is accessible through the contention procedure and the first channel is idle for a predetermined time and the second channel is also idle for a predetermined time, the wireless communication terminal may access the first channel and the second channel.

The operation of the wireless communication terminal for the Primary Channel is also applied to the APCH. Therefore, the wireless communication terminal may access a channel contiguous to the APCH when a channel accessible to the APCH through a contention procedure and contiguous to the APCH is idle for a predetermined time. For convenience of description, a channel contiguous to the APCH is referred to as a first channel, and a channel contiguous to the first channel is referred to as a second channel. In addition, if the APCH is accessible through the contention procedure and the first channel is idle for a predetermined time and the second channel is also idle for a predetermined time, the wireless communication terminal may access the first channel and the second channel. At this time, the predetermined time may be PIFS defined in 802.11. In another specific embodiment, the predetermined time may be xIFS defined by 802.11.

In the embodiment of FIG. 12, the wireless communication terminal independently performs a contention procedure in each of the Primary Channel and the fourth Secondary Channel Secondary channel #4. At this time, the fourth Secondary Channel Secondary channel #4 corresponds to the APCH described above. Specifically, the wireless communication terminal selects one random value in the same CW. The wireless communication terminal determines whether each of the Primary Channel and the fourth Secondary Channel Secondary channel #4 is idle during the selected random value. Each of the Primary Channel and the fourth Secondary Channel Secondary channel #4 is idle during the random value selected by the wireless communication terminal. Also, the first Secondary Channel Secondary channel #1 contiguous to the Primary Channel is idle during PIFS. Also, the second Secondary Channel Secondary channel #2 contiguous to the first Secondary Channel Secondary channel #1 is idle during PIFS. Also, the third Secondary Channel Secondary channel #3 contiguous to the second Secondary Channel Secondary channel #2 is idle during PIFS. The wireless communication terminal transmits data through the Primary Channel and the first Secondary Channel Secondary channel #1 to the fourth Secondary Channel Secondary channel #4.

Figure 13:
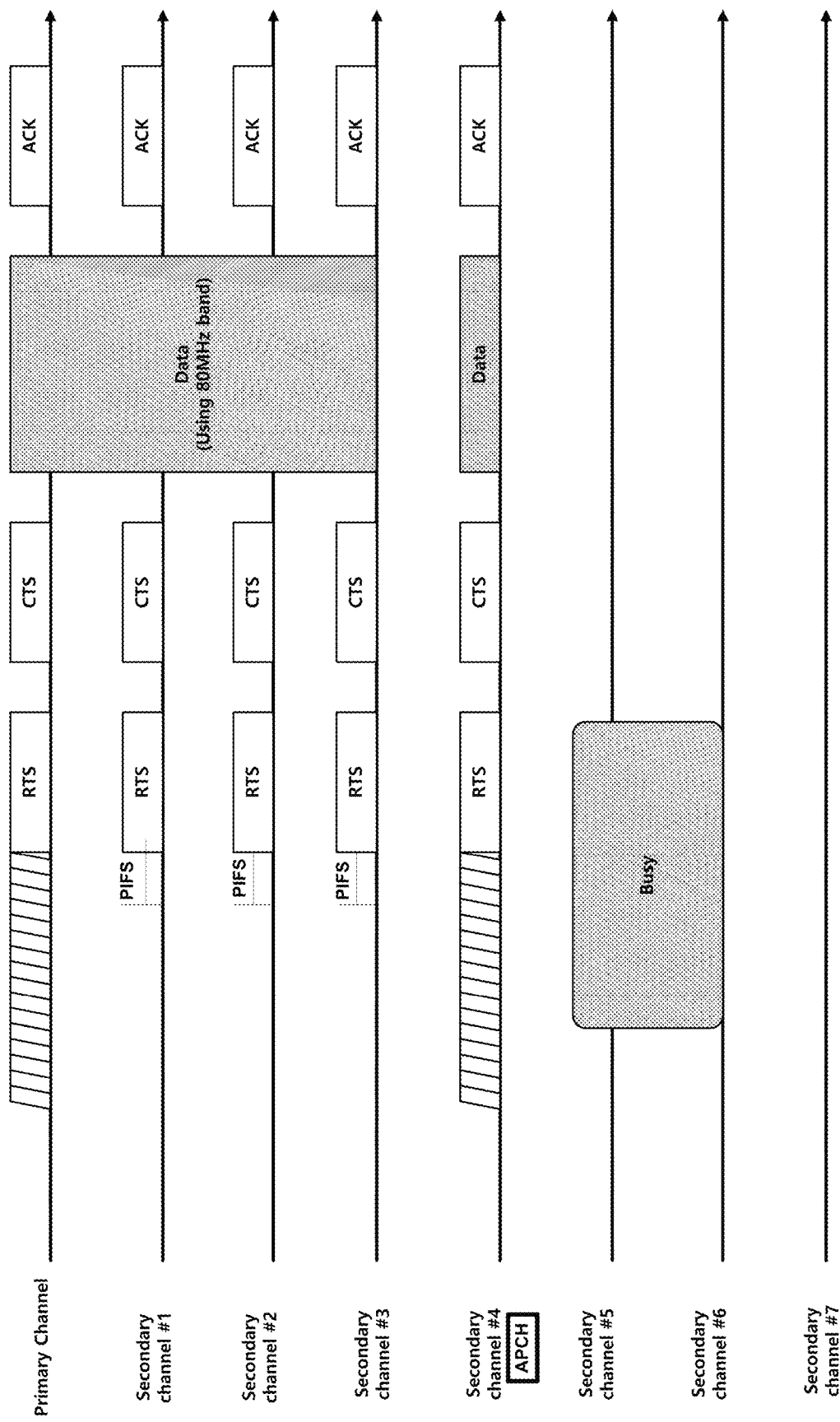
FIG. 13 is a view illustrating a method of transmitting an RTS frame and a CTS frame when a wireless communication terminal uses an APCH according to an embodiment of the present invention.

FIG. 13 is a view illustrating a method of transmitting an RTS frame and a CTS frame when a wireless communication terminal uses an APCH according to an embodiment of the present invention.

As described through the embodiment of FIG. 12, a wireless communication terminal according to an embodiment of the present invention performs a contention procedure in each of the Primary Channel and the APCH. At this time, the wireless communication terminal may transmit the transmission ready frame and the reception ready frame, described above, in a contiguous channel based on the contention procedure in each of the Primary Channel and the APCH. At this time, the operation of the wireless communication terminal with regard to channel access may be the same as the operation of the wireless communication terminal described in the embodiment of FIG. 12. However, the wireless communication terminal transmits the transmission ready frame instead of transmitting data immediately after accessing the channel. Also, the wireless communication terminal transmits data according to whether or not the reception ready frame is received.

In the embodiment of FIG. 13, the wireless communication terminal independently performs a contention procedure in each of the Primary Channel and the fourth Secondary Channel Secondary channel #4. At this time, the fourth Secondary Channel Secondary channel #4 corresponds to the APCH described above. Specifically, the wireless communication terminal selects one random value in the same CW. The wireless communication terminal determines whether each of the Primary Channel and the fourth Secondary Channel Secondary channel #4 is idle during the selected random value. Each of the Primary Channel and the fourth Secondary Channel Secondary channel #4 is idle during the random value selected by the wireless communication terminal. Also, the first Secondary Channel Secondary channel #1 contiguous to the Primary Channel is idle during PIFS. Also, the second Secondary Channel Secondary channel #2 contiguous to the first Secondary Channel Secondary channel #1 is idle during PIFS. Also, the third Secondary Channel Secondary channel #3 contiguous to the second Secondary Channel Secondary channel #2 is idle during PIFS. The wireless communication terminal transmits an RTS frame through the Primary Channel and the first Secondary Channel Secondary channel #1 to the fourth Secondary Channel Secondary channel #4. In addition, the wireless communication terminal receives a CTS frame through the first Secondary Channel Secondary channel #1 to the fourth Secondary Channel Secondary channel #4. The wireless communication terminal transmits data to the wireless communication terminal that transmits the CTS frame through the first Secondary Channel Secondary channel #1 to the fourth Secondary Channel Secondary channel #4.

When the APCH is used, it is possible to use the frequency band more effectively than the case of performing the contention procedure only for the Primary Channel, while reducing the computation burden on the wireless communication terminal.

When the wireless communication terminal performs the contention procedure only for the Primary Channel and performs channel expansion based on the Primary Channel, the wireless communication terminal receiving data may detect only the Primary Channel to determine whether the data is received.

However, when the wireless communication terminal uses the channel extending method described with reference to FIG. 6 to FIG. 13, the wireless communication terminal receiving data may decode the frames of all the channels to determine whether the data is received. Especially, when the wireless communication terminal uses a non-contiguous channel, the wireless communication terminal receiving data should decode the frames of all the channels to determine whether the data is received. In this case, an excessive amount of processing may be required for the wireless communication terminal receiving data. Therefore, there is a need for an operating method that can reduce the processing burden of the wireless communication terminals receiving the data. This will be described with reference to FIGS. 14 and 15.

Figure 14:
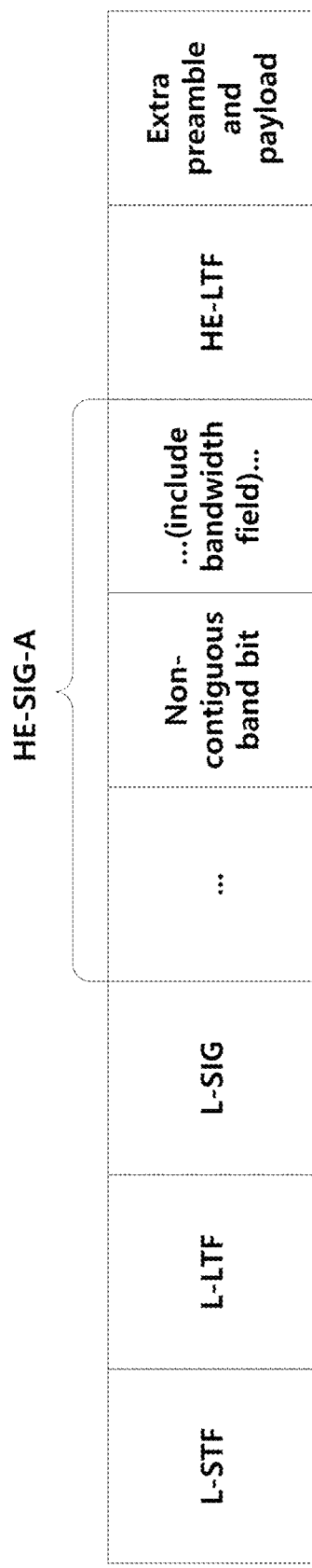
FIG. 14 is a view illustrating a physical frame for signaling information on a plurality of channels when a wireless communication terminal uses a plurality of channels according to an embodiment of the present invention.

FIG. 14 is a view illustrating a physical frame for signaling information on a plurality of channels when a wireless communication terminal uses a plurality of channels according to an embodiment of the present invention.

The wireless communication terminal may transmit contiguous frequency band information indicating whether to use a non-contiguous frequency band. Specifically, the wireless communication terminal may transmit the contiguous frequency band information through the signaling field of the physical frame. At this time, the signaling field of the physical frame may be the SIG-A field of the physical frame. In the embodiment of FIG. 14, the non-contiguous band bit indicates contiguous frequency band information.

The wireless communication terminal receiving data may receive data based on the contiguous frequency band information. Specifically, the wireless communication terminal receiving data may determine the channel to decode the frame based on the contiguous frequency band information.

For example, if the contiguous frequency band information indicates that the wireless communication terminal uses a non-contiguous frequency band, the wireless communication terminal receiving data may decode the physical frames of a plurality of channels. Specifically, if the contiguous frequency band information indicates that the wireless communication terminal uses a non-contiguous frequency band, the wireless communication terminal receiving data may decode the physical frames of all channels in BBS. In addition, the wireless communication terminal receiving data may obtain contiguous frequency band information from the signaling field of the physical frame. Specifically, the wireless communication terminal receiving data may obtain contiguous frequency band information from the SIG-A field of the physical frame.

Also, the wireless communication terminal may transmit both contiguous frequency band information and frequency bandwidth information indicating the bandwidth of a frequency band. Specifically, the wireless communication terminal may transmit the frequency band information through the signaling field of the physical frame. At this time, the signaling field of the physical frame may be the SIG-A field of the physical frame.

The wireless communication terminal receiving data may determine the channel to decode the physical frame based on the contiguous frequency band information and the frequency bandwidth information. Specifically, if the contiguous frequency band information indicates that the wireless communication terminal uses a contiguous frequency band, the wireless communication terminal receiving data may decode the physical frame of the channel, which corresponds to the frequency bandwidth indicated by the frequency bandwidth information from the Primary Channel.

Figure 15:
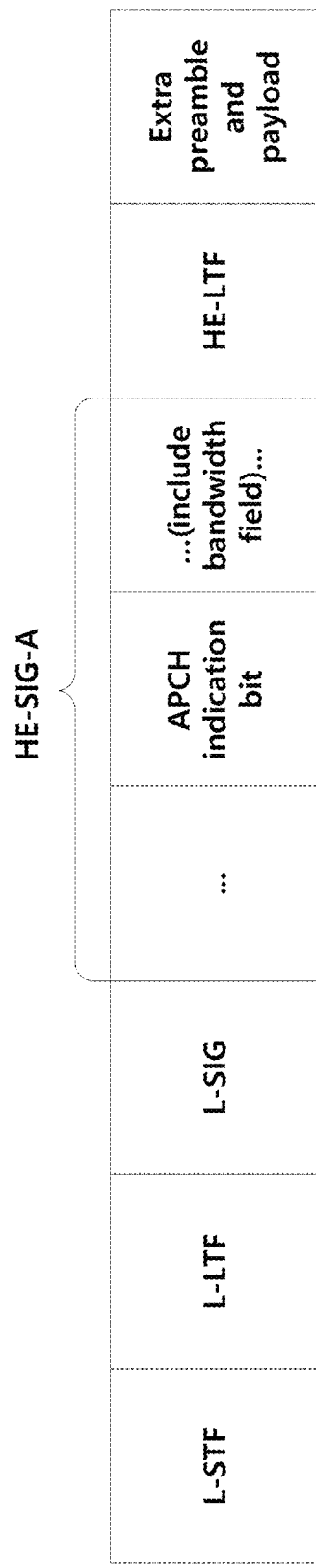
FIG. 15 is a view illustrating a physical frame for signaling information on an APCH when a wireless communication terminal uses the APCH according to another embodiment of the present invention.

FIG. 15 is a view illustrating a physical frame for signaling information on an APCH when a wireless communication terminal uses the APCH according to another embodiment of the present invention.

The wireless communication terminal may transmit APCH information indicating whether or not to use the APCH described above. The channel location of the APCH may be a predetermined location. In addition, if the channel location of the APCH is not specified in advance, the wireless communication terminal may transmit APCH location information indicating the channel location of the APCH. In addition, when using more than one APCH, the wireless communication terminal may transmit APCH number information indicating the number of APCHs. Specifically, the wireless communication terminal may transmit at least one of APCH information, APCH location information, and APCH number information through the signaling field of a physical frame. At this time, the signaling field of the physical frame may be the SIG-A field of the physical frame. In the embodiment of FIG. 15, the APCH indication bit indicates APCH information.

A wireless communication terminal receiving data may receive data based on the APCH information. Specifically, the wireless communication terminal receiving data may determine the channel to decode a physical frame based on the APCH information. Specifically, when the APCH information indicates that the wireless communication terminal uses the APCH, the wireless communication terminal receiving data may decode the primary frames of the Primary Channel and the APCH. In addition, the wireless communication terminal receiving data may determine a channel to decode a physical frame based on at least one of APCH location information and APCH number information in addition to APCH information. For example, if the channel location of the APCH is not specified in advance, the wireless communication terminal may determine a channel to decode a physical frame based on at least one of APCH information and APCH location information.

When transmitting data to a plurality of second wireless communication terminals through MU-MIMO, the first wireless communication terminal may determine a priority order based on the Access Category (AC) of a MAC Service Data Unit (MSDU). Also, the first wireless communication terminal may set a transmission opportunity (TXOP) based on the AC of the MSDU having the highest priority. At this time, AC indicates the priority according to the data type included in the MSDU. In addition, the TXOP indicates an interval of time during which the wireless communication terminal can use a wireless medium. At this time, the wireless medium may represent a channel in detail.

When the first wireless communication terminal transmits data to a plurality of second wireless communication terminals using OFDMA, unlike the case of using MU-MIMO, the channel used by each of the plurality of second wireless communication terminals may be different. Therefore, there is a need for a channel access method, a TXOP setting method, and a method of transmitting a frame indicating reception completion, which are different from the case that the first wireless communication terminal transmits data to a plurality of second wireless communication terminals using MU-MIMO. Particularly, there is a need for a channel access method of the first wireless communication terminal based on the AC, a TXOP setting method, and a method of transmitting a frame indicating reception completion. This will be described with reference to FIGS. 16 to 28.

Figure 16:
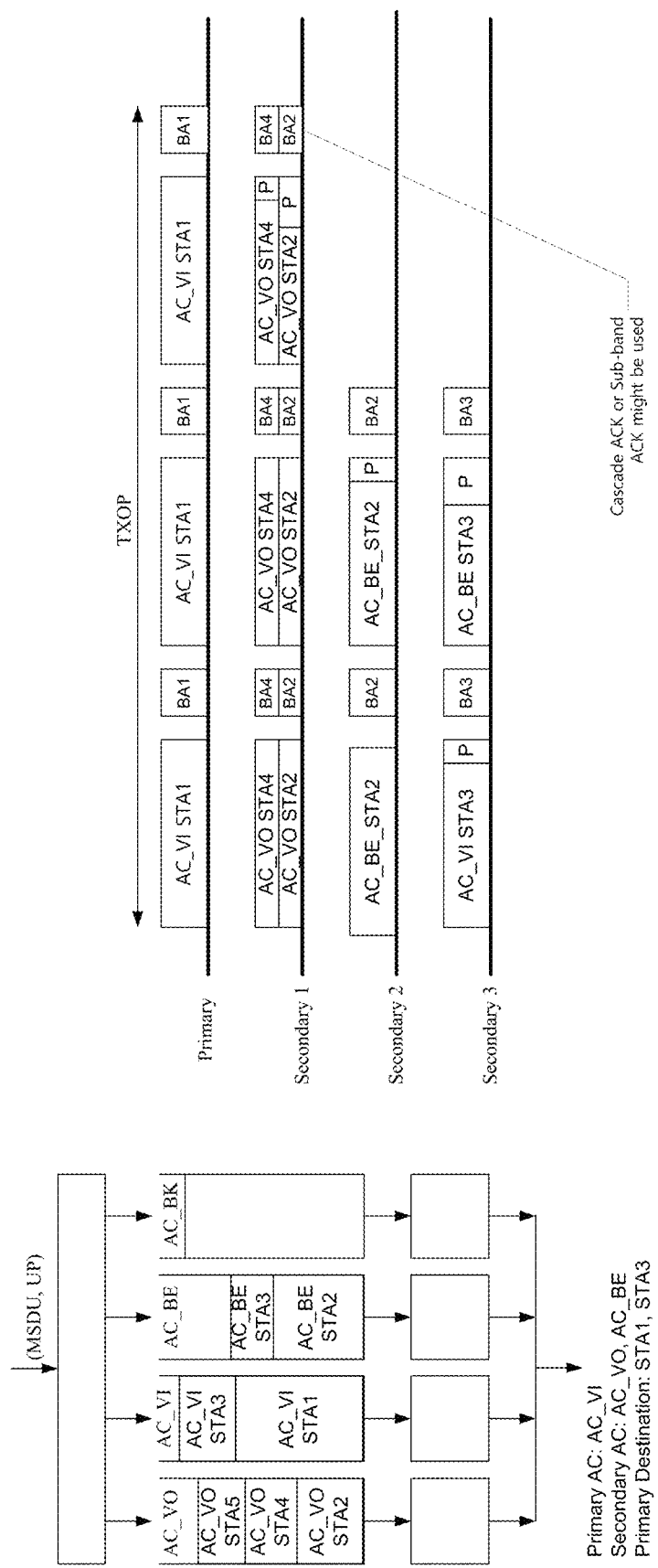
FIG. 16 is a view illustrating that an AP transmits data to a plurality of stations based on the AC of an MSDU according to an embodiment of the present invention.

FIG. 16 is a view illustrating that an AP transmits data to a plurality of stations based on the AC of an MSDU according to an embodiment of the present invention.

The first wireless communication terminal according to an embodiment of the present invention determines a TXOP based on an MSDU corresponding to an AC having the highest priority among a plurality of MSDUs in transmission standby. At this time, the first wireless communication terminal may allocate a spare frequency resource to another MSDU transmission except for an MSDU transmission corresponding to the highest priority AC during the determined TXOP.

Specifically, the first wireless communication terminal may determine whether to transmit data to a plurality of second wireless communication terminals according to a queue status of a MAC layer. In a specific embodiment, the first wireless communication terminal may determine whether to transmit data to the plurality of second wireless communication terminals based on the size of an MSDU corresponding to the AC having the highest priority and the length of a TXOP required for transmitting the MSDU corresponding to the AC having the highest priority.

When transmitting data to a plurality of second wireless communication terminals, the first wireless communication terminal may set a TXOP by the time required for transmitting the MSDU corresponding to the AC having the highest priority. In addition, the first wireless communication terminal may allocate to another MSDU transmission the remaining frequency band except the frequency band for transmitting an MSDU corresponding to the highest priority AC.

The first wireless communication terminal may allocate a frequency band to the transmission of an MSDU corresponding to the highest priority AC according to FIFO based on the order of entering the queue of a MAC layer. Specifically, among MSDUs corresponding to the highest priority AC, the frequency band may be preferentially allocated to the transmission of the MSDUs entering the MAC layer queue.

The first wireless communication terminal may allocate the remaining frequency band after a frequency band is allocated to the MSDU transmission corresponding to the highest priority AC according to the priority of the AC of the MSDU. In a specific embodiment, a specific frequency band allocation of the first wireless communication terminal may be changed by a separate scheduling operation. For example, the first wireless communication terminal may change the scheduling operation based on frequency selectivity.

For convenience of explanation, the AC having the highest priority among the ACs of a plurality of MSDUs is referred to as a primary AC and the remaining AC is referred to as a secondary AC. In addition, a second wireless communication terminal that receives an MSDU corresponding to the primary AC is referred to as a primary destination and a second wireless communication terminal that receives an MSDU corresponding to the secondary AC is referred to as a secondary destination.

In the embodiment of FIG. 16, the primary AC is AC_VI. In addition, the secondary AC is AC_VO and AC_BE in the priority order of ACs. At this time, the primary destinations are the first station STA1 and the third station STA3. In addition, the secondary destinations are the second station STA2 and the fourth station STA4.

As described above, the AP may transmit the MSDU corresponding to AC_VI, which is the primary AC among the plurality of MSDUs, with the highest priority. In addition, the AP may determine a TXOP based on the MSDU having AC_VI as an AC. In the embodiment of FIG. 16, the AP corresponds to AC_VI, which is the primary AC, and firstly transmits the MSDU having the first station STA1 as a destination, which first arrives at the MAC layer queue. Also, the AP sets a TXOP by the time required for transmitting the MSDU having the first station STA1 as a destination.

The AP first allocates to the MSDU transmission for the third station STA3, which is the primary destination, the remaining channels except for the Primary Channel allocated to the transmission of the MSDU for the first station STA1. Then, the AP allocates the remaining frequency bands to the MSDU transmissions for the second station STA2, the third station STA3, and the fourth station STA4.

The first wireless communication terminal may synchronize the time for starting the data transmission to the plurality of second wireless communication terminals and terminating the data transmission. To this end, the first wireless communication terminal may transmit padding data to the second wireless communication terminal. In the embodiment of FIG. 16, the AP transmits padding data to all data transmissions for the third station STA3. Also, the AP transmits padding data to the second data transmission through the second Secondary Channel Secondary 2 for the second station STA2 and the third data transmission through the first Secondary Channel Secondary 1. Then, the AP transmits padding data to the third data transmission for the fourth station STA4.

The first wireless communication terminal may allocate to the second wireless communication terminal the frequency band having the frequency bandwidth smaller than the minimum unit frequency bandwidth. At this time, the minimum unit frequency bandwidth represents the minimum frequency bandwidth used by the first wireless communication terminal. In addition, the second wireless communication terminal may transmit a reception completion frame indicating data reception completion through the frequency band having the frequency bandwidth smaller than the minimum unit frequency bandwidth. In the embodiment of FIG. 16, the minimum unit frequency bandwidth is 20 MHz, and the AP allocates to the fourth station STA4 the frequency band having the frequency bandwidth smaller than the minimum unit frequency bandwidth. In addition, the fourth station STA4 transmits an ACK frame through the frequency band having the frequency bandwidth smaller than the minimum unit frequency bandwidth. According to a specific embodiment, a plurality of second wireless communication terminals may sequentially transmit reception completion frames through the frequency band having the minimum unit frequency bandwidth.

Also, the first wireless communication terminal may transmit MSDUs corresponding to different ACs to one second wireless communication terminal through different frequency bands. In the embodiment of FIG. 16, the AP transmits an MSDU having AC_VO to the second station STA2 through some frequency bands of the first Secondary Channel Secondary 1, and transmits an MSDU having AC_BE to the second Secondary Channel Secondary 2.

When the first wireless communication terminal extends a channel based on the Primary Channel without transmitting data to a plurality of second wireless communication terminals through OFDMA, the second wireless communication terminal may decode only the physical frame received through the Primary Channel. However, when the first wireless communication terminal transmits data to a plurality of second wireless communication terminals through OFDMA, the second wireless communication terminal should decode a physical frame received through a channel except for the Primary Channel. However, if the second wireless communication terminal always has to decode a physical frame received through a channel except for the Primary Channel, the operation efficiency of the second wireless communication terminal may be lowered. Accordingly, the first wireless communication terminal may transmit information indicating whether to use OFDMA to the second wireless communication terminal. This will be described with reference to FIG. 17.

Figure 17:
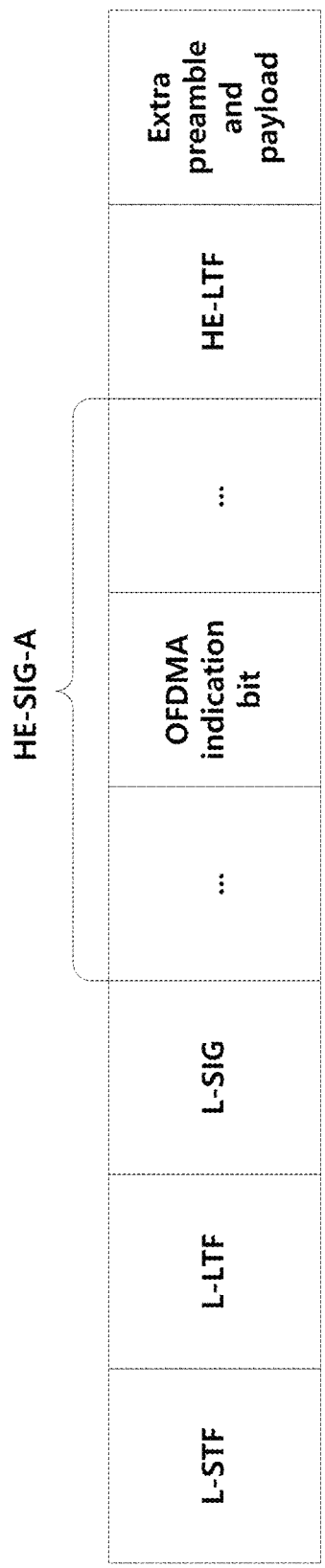
FIG. 17 is a view illustrating a structure of a physical frame transmitted when a first wireless communication terminal transmits data to a plurality of second wireless communication terminals according to an embodiment of the present invention.

FIG. 17 is a view illustrating a structure of a physical frame transmitted when a first wireless communication terminal transmits data to a plurality of second wireless communication terminals according to an embodiment of the present invention.

As described above, the first wireless communication terminal may transmit OFDMA usage information indicating whether or not to use OFDMA to the second wireless communication terminal. Specifically, the first wireless communication terminal may transmit the OFDMA usage information to the second wireless communication terminal through the signaling field of the physical frame. At this time, the signaling field of the physical frame may be a SIG-A field.

The OFDMA usage information may be integrated with information indicating whether the first wireless communication terminal uses MU-MIMO and thus may indicate whether the first wireless communication terminal transmits data to the plurality of second wireless communication terminals.

In another specific embodiment, the OFDMA usage information may indicate the contiguous frequency band information described above.

When the OFDMA usage information indicates that the first wireless communication terminal uses OFDMA, the second wireless communication terminal may decode the physical frame received through a channel except for the Primary Channel.

In the TXOP setting and the frequency band allocation method described in the embodiment of FIG. 16 described above, the first wireless communication terminal may not be able to utilize the TXOP even if there is a spare frequency band and the TXOP remains. Therefore, a frequency band allocation method is needed to solve this problem. This will be described with reference to FIG. 18.

Figure 18:
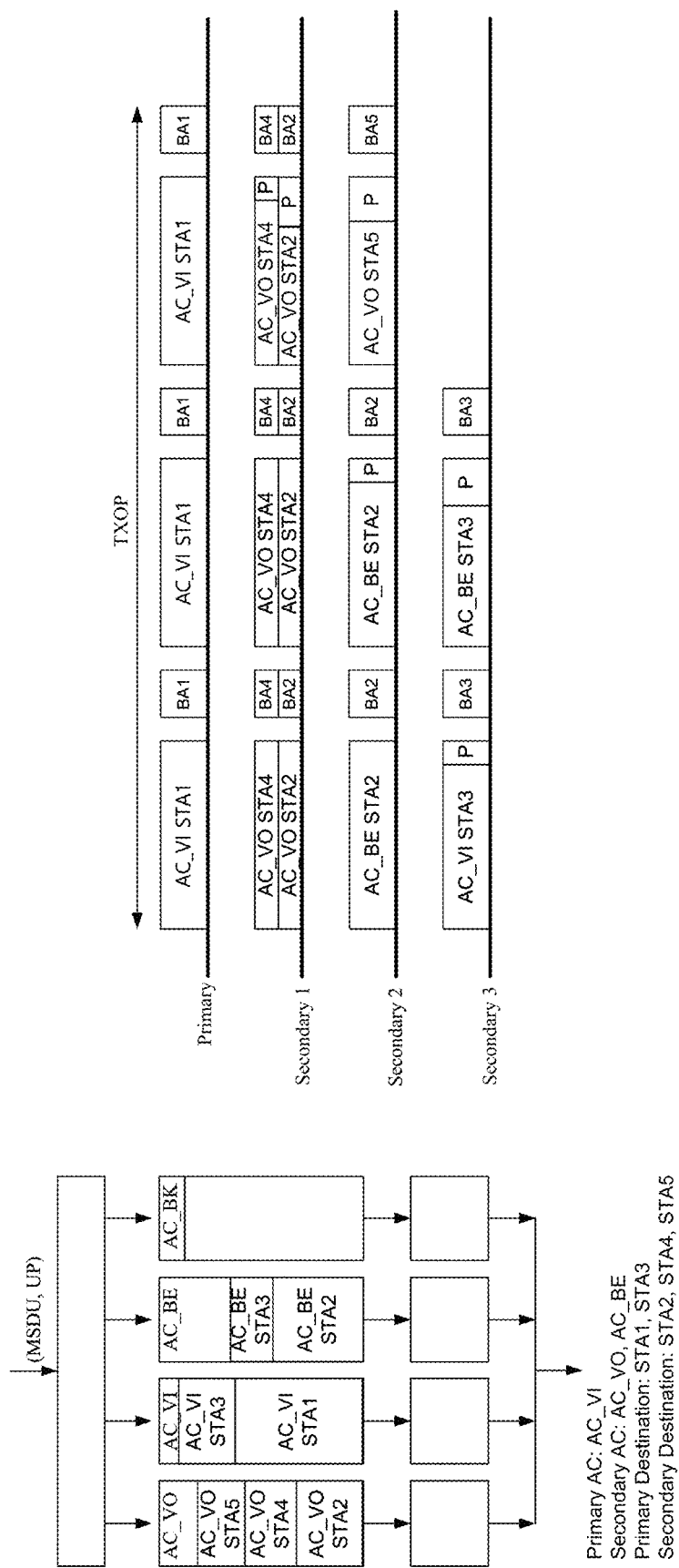
FIG. 18 is a view illustrating a method of an AP to allocate a TXOP to a plurality of stations according to an embodiment of the present invention.

FIG. 18 is a view illustrating a method of an AP to allocate a TXOP to a plurality of stations according to an embodiment of the present invention.

The first wireless communication terminal may further allocate to the second wireless communication terminal a frequency band in which data transmission ends before TXOP expiration. Specifically, in the frequency band allocation method described with reference to FIG. 16, the first wireless communication terminal may allocate a frequency band in which data transmission ends before TXOP expiration to an MSDU where no frequency band is allocated, according to the priority of an AC having an MSDU.

In the embodiment of FIG. 18, unlike the embodiment of FIG. 16, the AP transmits data including an MSDU having AC_VO as an AC to the fifth station STA5 during a TXOP remaining after transmitting data to the second station STA2 through the second Secondary Channel Secondary 2. In the embodiment of FIG. 18, the other operations of the AP and the plurality of stations are all the same as those of the embodiment of FIG. 16.

Through such an operation, the first wireless communication terminal may efficiently use a frequency band.

If there is no frequency band allocated to the second wireless communication terminal, the second wireless communication terminal may enter or wait for the sleep state during the set TXOP. Specifically, if there is no frequency band allocated to the second wireless communication terminal at the TXOP start time point, the second wireless communication terminal may enter or wait for the sleep state during the set TXOP. However, if the first wireless communication terminal further allocates a frequency band in which data transmission ends before TXOP expiration to the second wireless communication terminal, the second wireless communication terminal cannot enter the sleep state. Therefore, it is necessary for the first wireless communication terminal to signal the time point at which the second wireless communication terminal receives data to the second wireless communication terminal. This will be described with reference to FIG. 19.

Figure 19:
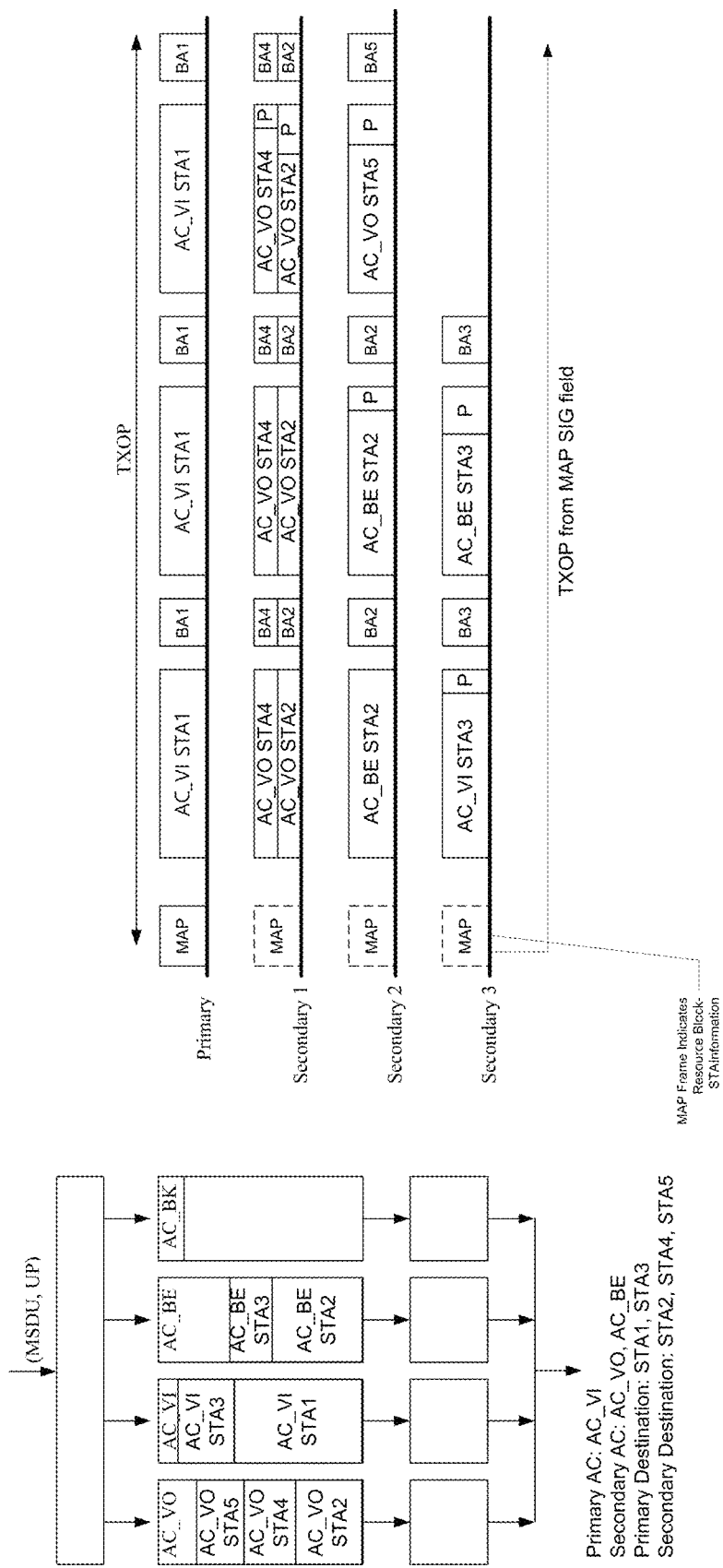
FIG. 19 is a view illustrating a method of an AP to transmit data to a plurality of stations through a MAC frame for signaling information on data transmission according to an embodiment of the present invention.

FIG. 19 is a view illustrating a method of an AP to transmit data to a plurality of stations through a MAC frame for signaling information on data transmission according to an embodiment of the present invention.

The first wireless communication terminal may transmit frequency band allocation information indicating information on a frequency band allocated to the second wireless communication terminal. Further, the first wireless communication terminal may transmit time allocation information indicating the time at which the second wireless communication terminal receives data to the second wireless communication terminal. Specifically, the first wireless communication terminal may transmit a MAP frame, which is a MAC frame including frequency band allocation information and time allocation information, to the second wireless communication terminal.

The second wireless communication terminal may enter the sleep state or wake up from the sleep state based on the time allocation information. Specifically, the second wireless communication terminal may obtain the times at which the second wireless communication terminal starts to receive data and end from the time allocation information. At this time, the second wireless communication terminal may wake up from the sleep state at the time of starting data reception. Also, the second wireless communication terminal may enter the sleep state at the time of ending data reception. For example, the second wireless communication terminal may obtain the frequency band allocation information and the time allocation information from the MAP frame. The second wireless communication terminal may wake up from the sleep state based on the time allocation information and receive data based on the frequency band allocation information.

Also, the first wireless communication terminal may transmit the MAP frame through the Primary Channel. At this time, before receiving the MAP frame, the second wireless communication terminal may decode the physical frame received through the Primary Channel. After receiving the MAP frame, the terminal may decode a physical frame received through another channel based on the second wireless communication frequency band allocation information and time allocation information. In another specific embodiment, the first wireless communication terminal may transmit the MAP frame through all channels available to the first wireless communication terminal.

In the embodiment of FIG. 19, the AP transmits the MAP frame. As described above, the AP may transmit the MAP frame through the Primary Channel Primary. In another specific embodiment, the AP may transmit a MAP frame through each of the Primary Channel Primary, the first Secondary Channel Secondary 1, the second Secondary Channel Secondary 2, and the third Secondary Channel Secondary 3.

In the embodiment of FIG. 19, the AP transmits data to a plurality of stations in the same manner as described with reference to FIG. 18. However, the fifth station STA5 may obtain frequency band allocation information and time allocation information on the fifth station STA5 through the MAP frame. The fifth station STA5 may maintain the sleep state based on the time allocation information. Specifically, the fifth station STA5 may maintain the sleep state before the data for the fifth station STA5 is transmitted, and may wake up from the sleep state when the data for the fifth station STA5 is transmitted.

Through such an operation, the first wireless communication terminal may increase the operation efficiency of the second wireless communication terminal.

When the second wireless communication terminal fails to receive data from the first wireless communication terminal, this will be described with reference to FIG. 20.

Figure 20:
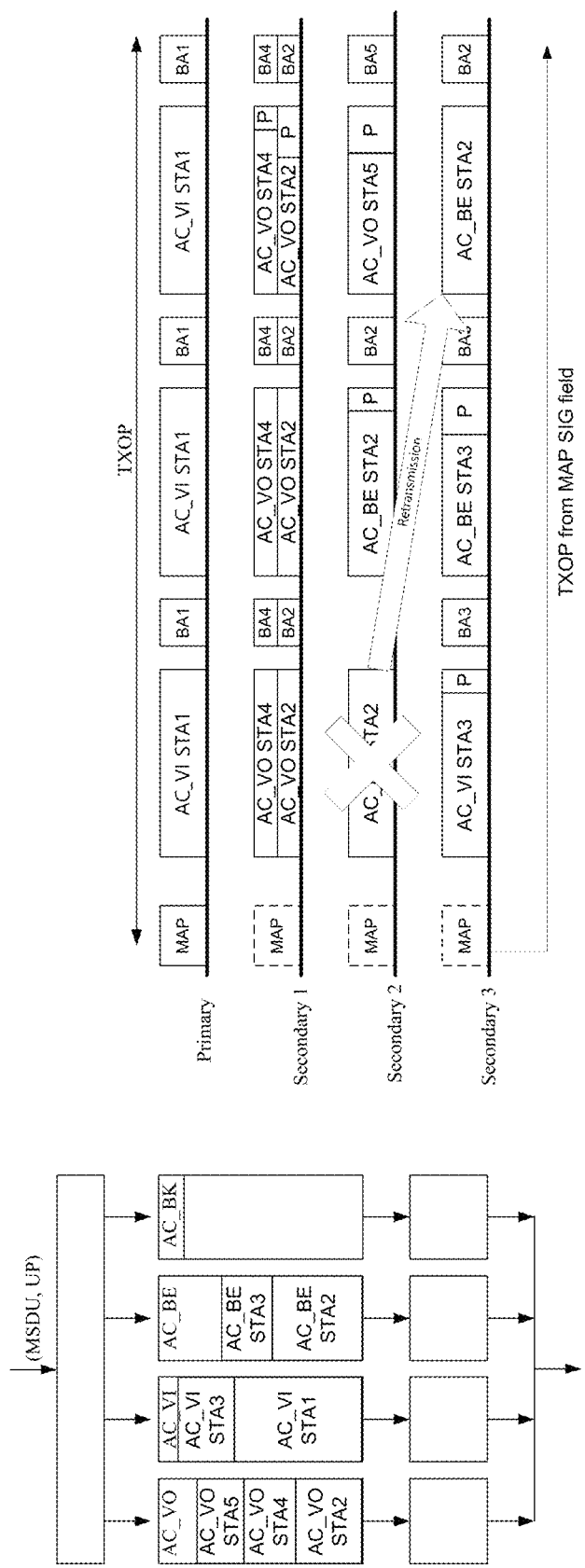
FIG. 20 is a view illustrating a method of an AP to transmit data to a station again when the AP fails to transmit the data to any one of a plurality of stations according to an embodiment of the present invention.

FIG. 20 is a view illustrating a method of an AP to transmit data to a station again when the AP fails to transmit the data to any one of a plurality of stations according to an embodiment of the present invention.

The second wireless communication terminal cannot transmit a reception completion frame to the first wireless communication terminal. Accordingly, the first wireless communication terminal may know that the second wireless communication terminal does not receive the data. When the first wireless communication terminal fails to transmit the reception completion frame, the second wireless communication terminal may retransmit the data to the second wireless communication terminal. The first wireless communication terminal may retransmit data to the second wireless communication terminal through the unused frequency band during the remaining TXOP.

In another specific embodiment, when the frequency band allocation information and the time allocation information indicate data transmission for the second wireless communication terminal but the second wireless communication terminal does not receive the data, the second wireless communication terminal may request data retransmission from the first wireless communication. Specifically, the second wireless communication terminal may request data retransmission from the first wireless communication terminal during the remaining TXOP. The first wireless communication terminal may retransmit data to the second wireless communication terminal through the unused frequency band during the remaining TXOP.

In addition, the second wireless communication terminal, which does not receive the data, may know a frequency band not used for a predetermined time during the TXOP set through the frequency band allocation information and the time allocation information. Accordingly, the second wireless communication terminal may decode the physical frame received through the unused frequency band in the TXOP for a predetermined time. At this time, if the decoded physical frame is data on the second wireless communication terminal, the second wireless communication terminal may receive data included in the decoded physical frame.

In the embodiment of FIG. 20, the AP transmits a MAP frame and transmits data to a plurality of stations as described in the embodiment of FIG. 19. However, in the embodiment of FIG. 20, the second station STA2 does not receive data including an MSDU whose the AC transmitted by the AP to the second station STA2 is AC_BE. Therefore, the second station STA2 does not transmit to the AP an ACK frame for the data including the MSDU whose AC is AC_BE.

Accordingly, the AP retransmits the data including the MSDU whose AC is AC_BE to the second station STA2 through a time interval during which the third secondary channel Secondary 3 is not used during the set TXOP.

The second station STA2 decodes the physical frame transmitted through the third Secondary Channel Secondary 3 during a time section where the third Secondary Channel Secondary 3 is not used. The second station STA2 identifies that the decoded physical frame is a retransmitted physical frame for the second station STA2. The second station STA2 receives data included in the decoded physical frame.

In the embodiment described with reference to FIG. 20, the first wireless communication terminal and the second wireless communication terminal may use the transmission ready frame and the reception ready frame described above in order to prevent channel access by a hidden node. This will be described with reference to FIG. 21.

Figure 21:
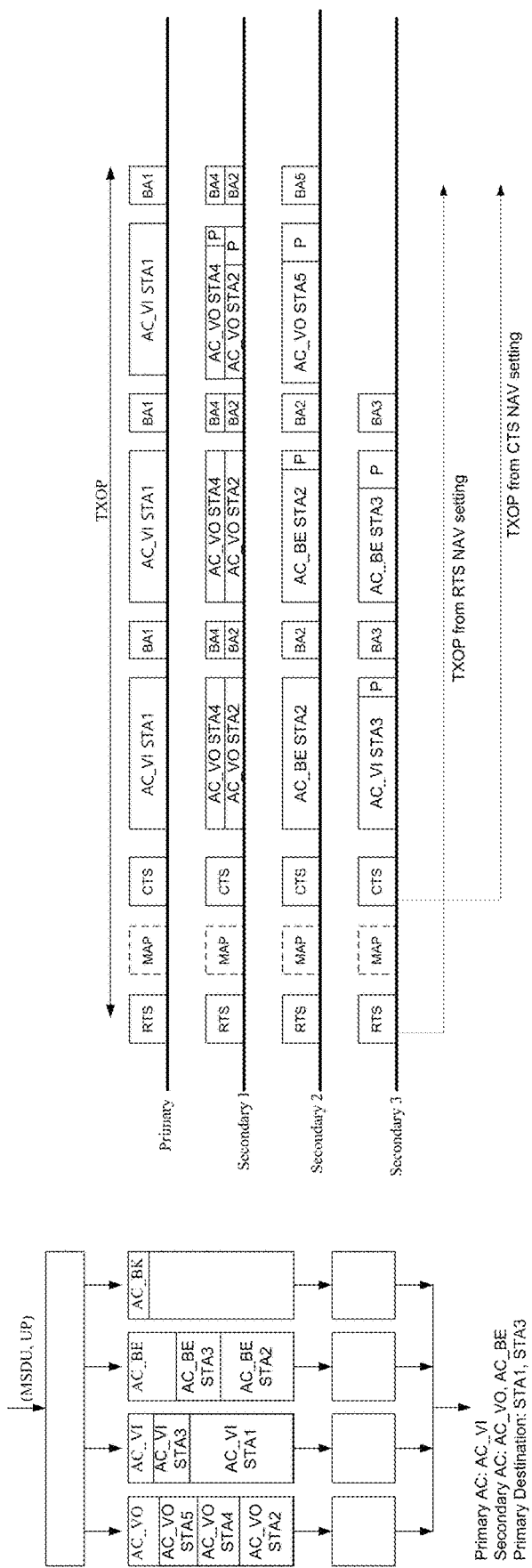
FIG. 21 is a view illustrating a method of an AP to set a NAV through a MAC frame according to an embodiment of the present invention.

FIG. 21 is a view illustrating a method of an AP to set a NAV through a MAC frame according to an embodiment of the present invention.

As described above, the first wireless communication terminal and the second wireless communication terminal may set the NAV to a wireless communication terminal contiguous to the first wireless communication terminal and the second wireless communication terminal by using the transmission ready frame and the reception ready frame. Specifically, the first wireless communication terminal may transmit a transmission ready frame and transmit a MAP frame. At this time, the transmission ready frame and the MAP frame may be integrated into one frame. In addition, the transmission ready frame may be an RTS-to-Self frame indicating that the first wireless communication terminal transmits a reception address transmission ready frame, and the first wireless communication terminal transmits data to a plurality of second wireless communication terminals.

The plurality of second wireless communication terminals may transmit the same reception ready frame. At this time, since all of the reception ready frames transmitted by the plurality of second wireless communication terminals are the same, collision does not occur even if the plurality of second wireless communication terminals simultaneously transmit reception ready frames through the same frequency band. However, the first wireless communication terminal may not distinguish which second wireless communication terminal transmits the reception ready frame.

Also, the plurality of second wireless communication terminals may sequentially transmit the reception ready frame in one frequency band.

In addition, the plurality of second wireless communication terminals may transmit the reception ready frame through the frequency band allocated to each of the plurality of second wireless communication terminals. In another specific embodiment, the plurality of second wireless communication terminals may transmit a reception ready frame through a frequency band that each of the plurality of second wireless communication terminals can use.

In such an embodiment, the plurality of second wireless communication terminals may transmit a reception ready frame through a sub-channel having a frequency bandwidth smaller than the unit frequency bandwidth.

In the embodiment of FIG. 21, the AP transmits the RTS frame. As described above, the AP may transmit an RTS frame and transmit a MAP frame. Also, in a specific embodiment, the RTS frame and the MAP frame may be integrated into one frame.

The plurality of stations transmit the CTS frame to the AP through the frequency band allocated to each of the plurality of stations.

In the embodiment of FIG. 21, the other operations of the AP and the plurality of stations are all the same as those of the embodiment of FIG. 19.

In the embodiments described through FIGS. 16 to 21, the first wireless communication terminal transmits an MSDU corresponding to the secondary AC through an additional source, while transmitting an MSDU corresponding to the primary AC. However, in this case, the original purpose of preferentially transmitting the MSDU corresponding to the highest priority AC may not be achieved. Accordingly, through FIGS. 22 and 23, a method for preferentially allocating a frequency band and a transmission time section to an MSDU transmission corresponding to a primary AC by a first wireless communication terminal will be described.

Figure 22:
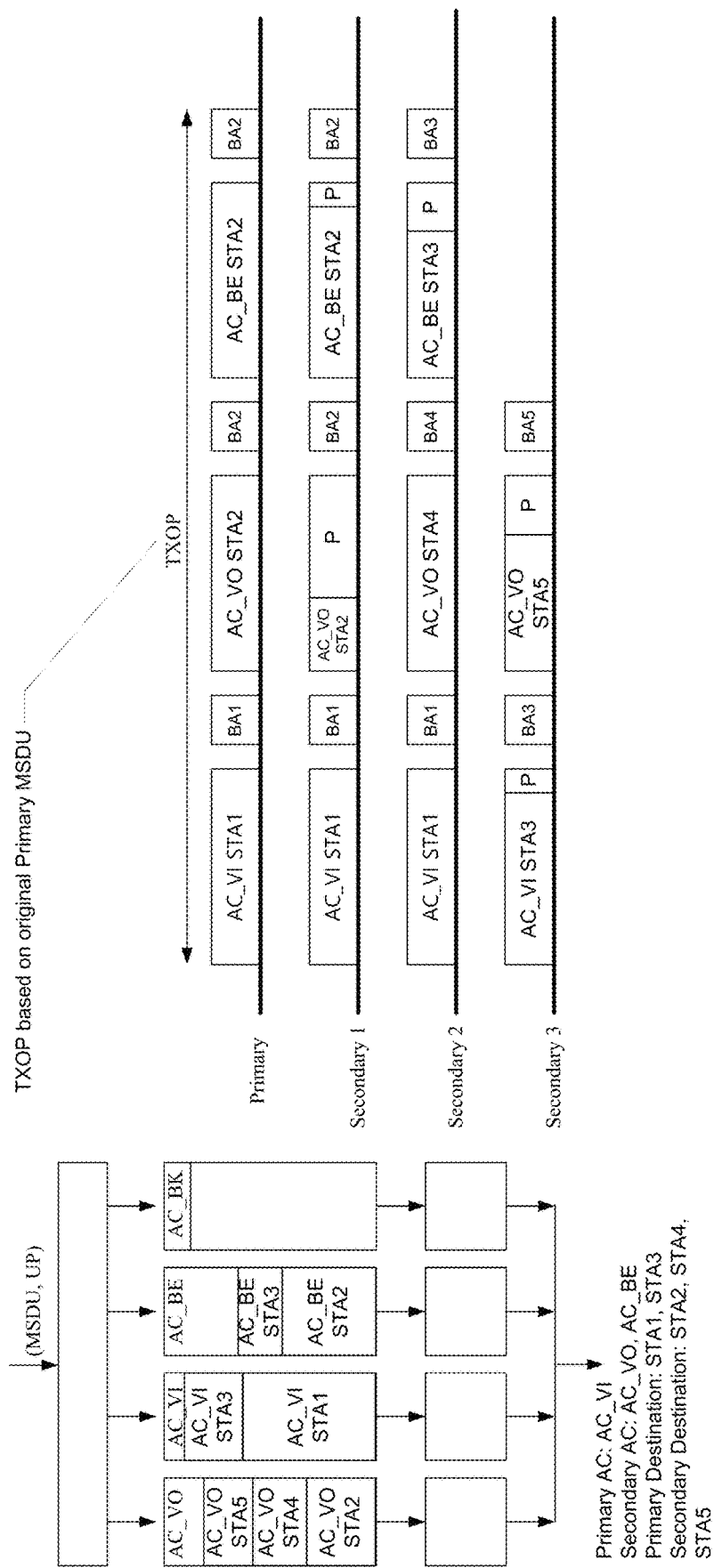
FIG. 22 is a view illustrating a method of an AP to allocate a TXOP to a plurality of stations according to another embodiment of the present invention.

FIG. 22 is a view illustrating a method of an AP to allocate a TXOP to a plurality of stations according to another embodiment of the present invention.

The first wireless communication terminal may allocate the frequency band and the transmission time section to the MSDU transmission to be transmitted to the primary destination so as to transmit the MSDU to be transmitted to the primary destination as fast as possible. The first wireless communication terminal may allocate the frequency band and the transmission time section to the MSDU transmission to be transmitted to the primary destination and allocate the remaining frequency band and transmission time section to the remaining MSDU transmission.

Specifically, the first wireless communication terminal may determine whether to transmit data to a plurality of second wireless communication terminals according to a queue status of a MAC layer. In a specific embodiment, the first wireless communication terminal may determine whether to transmit data to the plurality of second wireless communication terminals based on the size of an MSDU corresponding to the primary AC and the length of a TXOP required for transmitting the MSDU corresponding to the AC having the highest priority.

When transmitting data to a plurality of second wireless communication terminals, the first wireless communication terminal may set a TXOP by the time required for transmitting the MSDU corresponding to the AC having the highest priority. Also, the first wireless communication terminal may allocate the frequency band and the transmission time section to the transmission of the MSDU corresponding to the primary AC so as to transmit the MSDU corresponding to the primary AC most rapidly. At this time, the first wireless communication terminal may allocate a frequency band to the MSDU transmission corresponding to the primary AC according to FIFO based on the order of entering the queue of a MAC layer. Specifically, the frequency band may be preferentially allocated to the transmission of the MSDU first entering the MAC layer queue among MSDUs corresponding to the primary AC.

The first wireless communication terminal may allocate the remaining frequency band after a frequency band is allocated to the MSDU transmission corresponding to the highest priority AC according to the priority of the AC of the MSDU. In a specific embodiment, a specific frequency band allocation of the first wireless communication terminal may be changed by a separate scheduling operation. For example, the first wireless communication terminal may change the scheduling operation based on frequency selectivity.

Also, the first wireless communication terminal may not use a frequency band not used for data transmission in the corresponding TXOP in order for data transmission. Thus, the first wireless communication terminal may reduce the operational burden of the second wireless communication terminal.

In the embodiment of FIG. 22, the AP sets the TXOP based on the MSDU corresponding to AC_VI, which is the primary AC.

Also, the AP preferentially allocates the frequency band and the transmission time section to the MSDU transmission corresponding to AC_VI, which is the primary AC. The AP allocates the entire frequency band to the transmission of an MSDU corresponding to AC_VI for the first station STA1 and the transmission of an MSDU corresponding to AC_VI for the third station STA3. Accordingly, the AP first completes the transmission of an MSDU corresponding to AC_VI for the first station STA1 and the transmission of an MSDU corresponding to AC_VI for the third station STA3.

Then, the AP transmits an MSDU corresponding to a secondary AC to a plurality of stations.

The first wireless communication terminal may set a TXOP based on the primary destination rather than the MSDU corresponding to the primary AC. This will be described with reference to FIG. 23.

Figure 23:
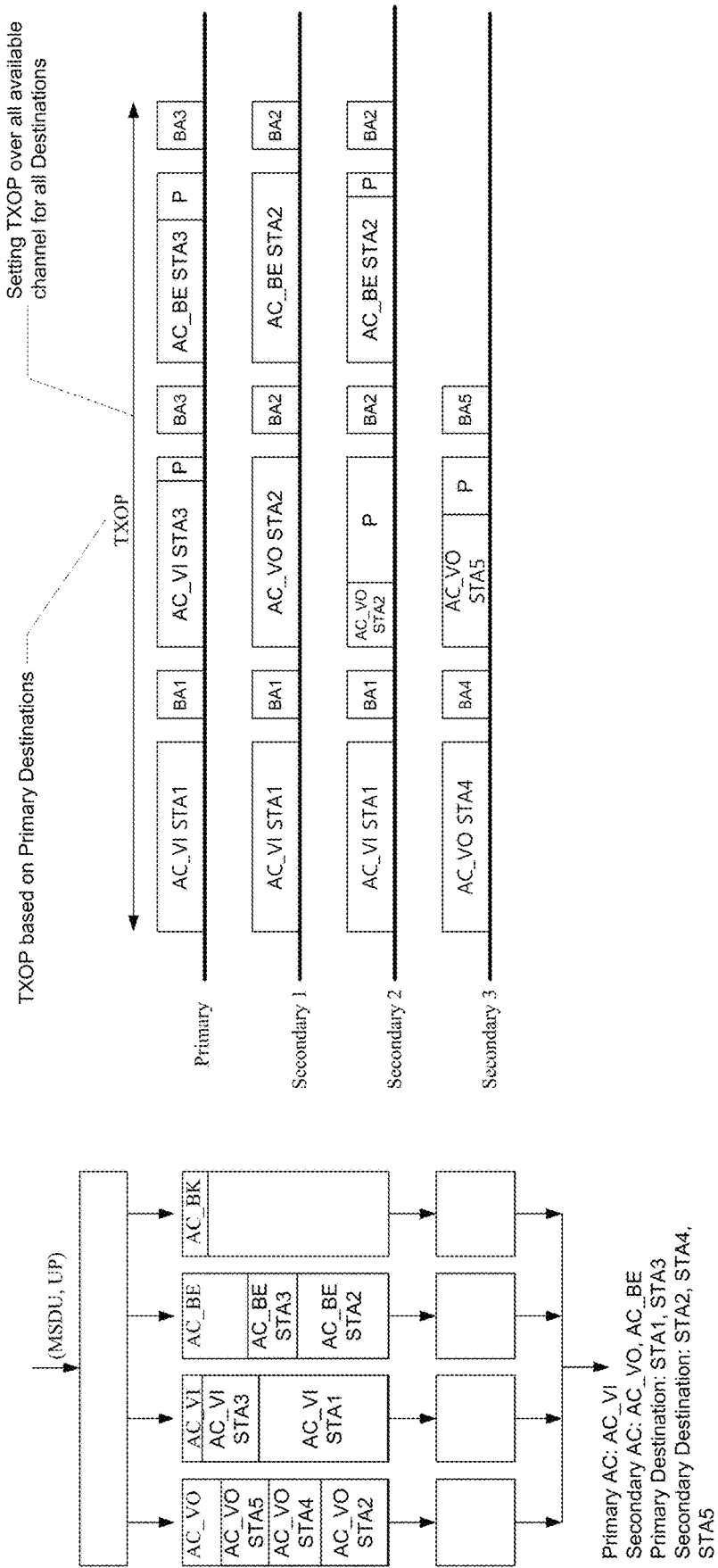
FIG. 23 is a view illustrating a method of an AP to allocate a TXOP to a plurality of stations depending on a primary destination according to another embodiment of the present invention.

FIG. 23 is a view illustrating a method of an AP to allocate a TXOP to a plurality of stations depending on a primary destination according to another embodiment of the present invention.

The first wireless communication terminal may set a TXOP based on the primary destination. Specifically, the first wireless communication terminal may set a TXOP based on the MSDU to be transmitted to the primary destination within the maximum TXOP value of the primary AC.

Specifically, the first wireless communication terminal may determine whether to transmit data to a plurality of second wireless communication terminals according to a queue status of a MAC layer. In a specific embodiment, the first wireless communication terminal may determine whether to transmit data to the plurality of second wireless communication terminals based on the size of an MSDU corresponding to the primary AC and the length of a TXOP required for transmitting the MSDU corresponding to the AC having the highest priority.

The first wireless communication terminal may allocate the frequency band and the transmission time section including the Primary Channel to the transmission of the MSDU corresponding to the primary AC so as to first transmit the MSDU corresponding to the primary AC most rapidly. Thereafter, the first wireless communication terminal may sequentially allocate the Primary Channel to the transmission of the MSDU corresponding to the primary destination.

At this time, the first wireless communication terminal may allocate a frequency band to the MSDU transmission for the primary destination according to FIFO based on the order of entering the queue of a MAC layer. Specifically, the frequency band including the Primary Channel may be preferentially allocated to the transmission of the MSDU first entering the MAC layer queue among MSDUs corresponding to the primary AC.

The first wireless communication terminal may allocate the remaining frequency band after a frequency band is allocated to the MSDU transmission corresponding to the primary destination according to the priority of the AC of the MSDU. In a specific embodiment, a specific frequency band allocation of the first wireless communication terminal may be changed by a separate scheduling operation. For example, the first wireless communication terminal may change the scheduling operation based on frequency selectivity.

Also, the first wireless communication terminal may not use a frequency band not used for data transmission in the corresponding TXOP in order for data transmission. Through this, the first wireless communication terminal may reduce the operational burden of the second wireless communication terminal.

According to such an operation, when the first wireless communication terminal completes data transmission to the primary destination, it stops the transmission.

In the embodiment of FIG. 23, the AP transmits an MSDU corresponding to AC_VI, which is the primary AC, to the first station STA1 through the Primary Channel Primary, the first Secondary Channel Secondary 1, and the second Secondary Channel Secondary 2.

The AP transmits the MSDU corresponding to the third station STA3, which is the primary destination, through the Primary Channel Primary according to the AC. The AP transmits the MSDU corresponding to the third station STA3, which is the primary destination, through the Primary Channel Primary according to the AC.

The AP transmits an MSDU that does not correspond to the primary destination through the remaining frequency band and the time section within the TXOP.

When the TXOP is set too short, it may be difficult for the first wireless communication terminal to simultaneously transmit data to the plurality of second wireless communication terminals. An operation method of the first wireless communication terminal to solve this problem will be described with reference to FIG. 24.

Figure 24:
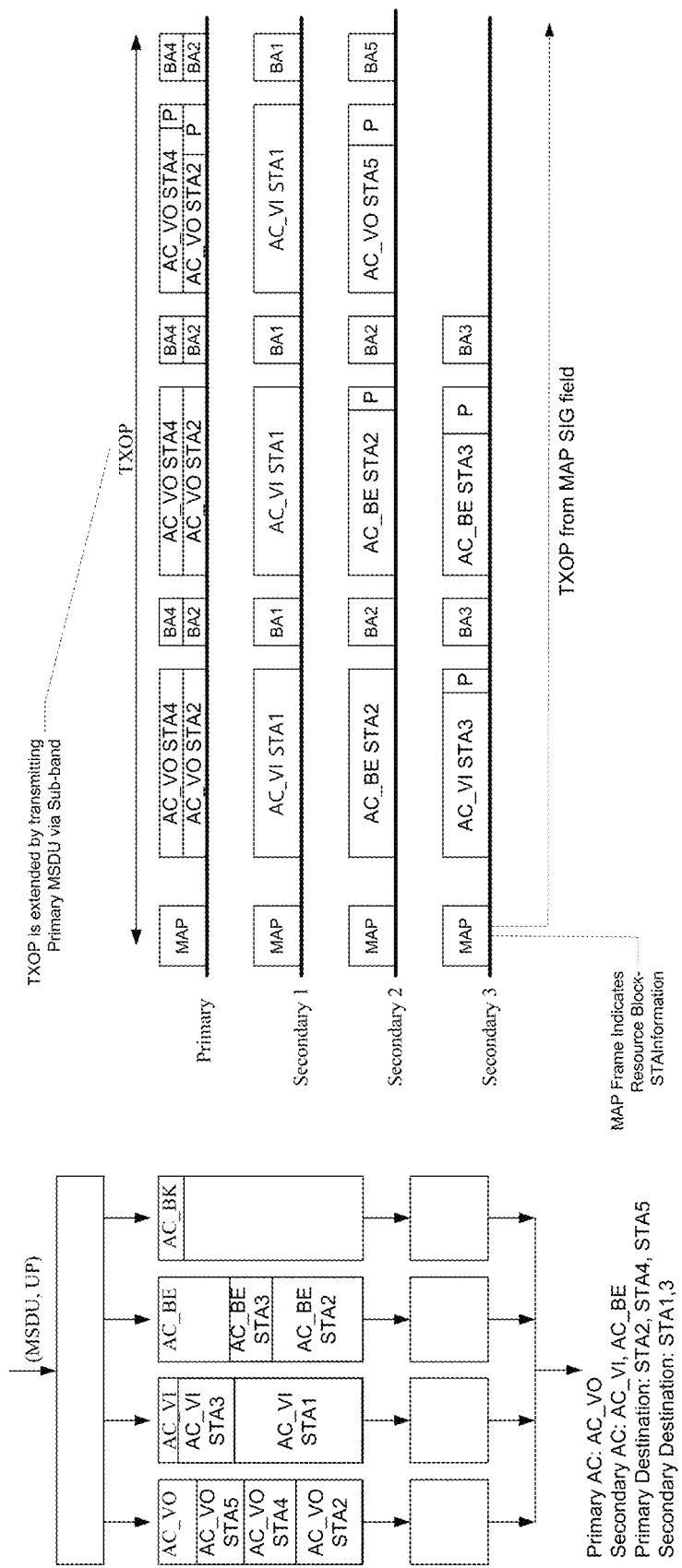
FIG. 24 is a view illustrating a method of an AP to allocate a TXOP to a plurality of stations through a sub-channel having a frequency bandwidth smaller than a unit frequency bandwidth in order to obtain a sufficient TXOP for transmitting data to the plurality of station according to another embodiment of the present invention.

FIG. 24 is a view illustrating a method of an AP to allocate a TXOP to a plurality of stations through a sub-channel having a frequency bandwidth smaller than a unit frequency bandwidth in order to obtain a sufficient TXOP for transmitting data to the plurality of station according to another embodiment of the present invention.

In the above-described embodiment, the first wireless communication terminal sets the TXOP based on the MSDU corresponding to the primary AC or the MSDU corresponding to the primary destination. Therefore, if an excessively large frequency band is allocated to an MSDU corresponding to the primary AC or an MSDU corresponding to the primary destination, the TXOP may be excessively shortened. Therefore, the first wireless communication terminal may allocate a channel smaller than the unit frequency bandwidth to the MSDU corresponding to the primary AC or the MSDU corresponding to the primary destination. Specifically, when a channel of the unit frequency bandwidth or more is allocated to an MSDU corresponding to the primary AC or an MSDU corresponding to the primary destination and at this time, the time required for transmitting the MSDU corresponding to the primary AC or the MSDU corresponding to the primary destination is shorter than the predetermined time length, the first wireless communication terminal may allocate a channel smaller than the unit frequency bandwidth to the MSDU corresponding to the primary AC or the MSDU corresponding to the primary destination.

In the embodiment of FIG. 24, the primary AC is AC_VO. When the AP transmits an MSDU corresponding to AC_VO through the entire Primary Channel Primary, it may transmit the MSDU corresponding to AC_VO in two times separately. In this case, the AP does not have enough time to transmit data to other stations.

Therefore, the AP transmits the MSDU corresponding to AC_VO through the sub-channel included in the Primary Channel Primary.

Thus, the AP may secure time to transmit MSDUs except for the MSDU corresponding to AC_VO.

It is described with reference to FIGS. 16 to 24 that the first wireless communication terminal sets the TXOP and the plurality of MSDUs are transmitted to the plurality of second wireless communication terminals. In this embodiment, an operation for the second wireless communication terminal to receive data including a plurality of MSDUs is described. An operation for the second wireless communication terminal to receive data including a plurality of MSDUs will be described in more detail with reference to FIGS. 25 to 28.

Figure 25:
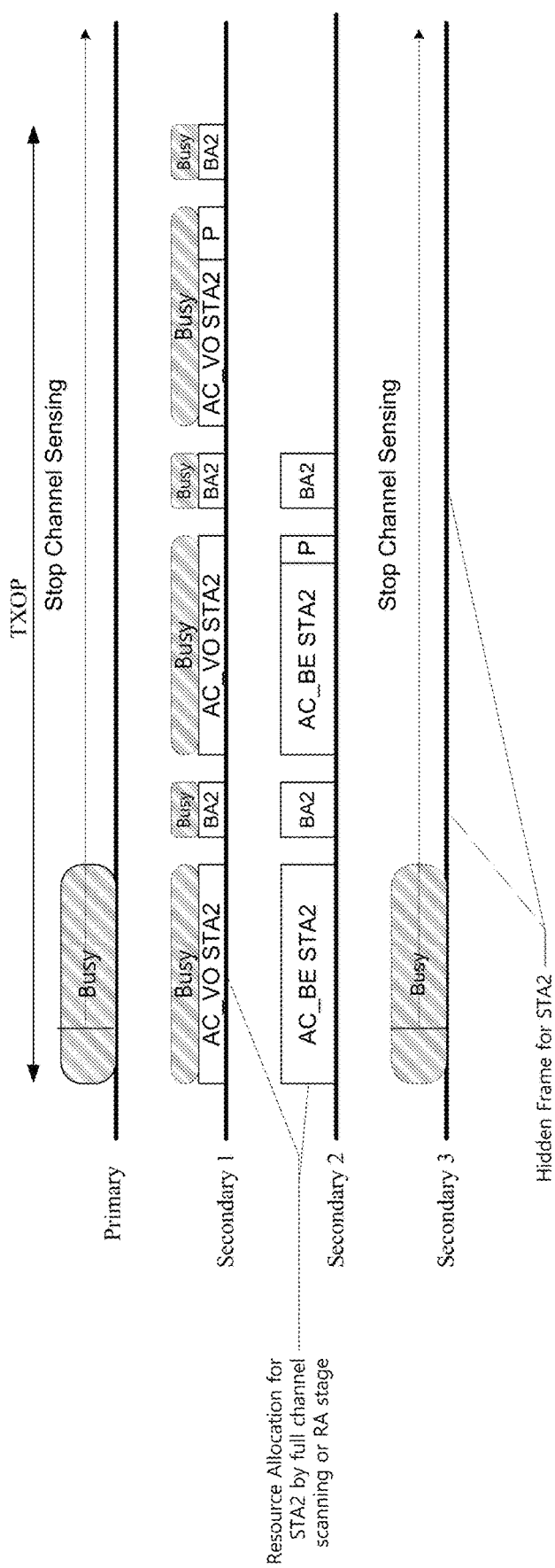
FIG. 25 is a view illustrating a data reception operation of a second station in the embodiment of FIG. 16 according to an embodiment of the present invention.

FIG. 25 is a view illustrating a data reception operation of a second station in the embodiment of FIG. 16 according to an embodiment of the present invention.

As described above, when data for the second wireless communication terminal is not transmitted, the second wireless communication terminal may enter the sleep state. Specifically, the second wireless communication terminal may enter the sleep state during a time section where data for the second wireless communication terminal is not transmitted within the TXOP set by the first wireless communication terminal.

Specifically, when the first wireless communication terminal uses the OFDMA, the second wireless communication terminal may decode the physical frame coming in through the entire frequency band used by the first wireless communication terminal. At this time, the second wireless communication terminal may determine whether to use the OFDMA of the first wireless communication terminal based on the signaling field of the physical frame. Specifically, the second wireless communication terminal may determine whether to use the OFDMA of the first wireless communication terminal based on the OFDMA usage information described above.

The second wireless communication terminal may decode the physical frame received through the frequency band to determine whether it is the frequency band allocated to the second wireless communication terminal. At this time, the second wireless communication terminal may stop the decoding of the physical frame received through the frequency band not allocated to the second wireless communication terminal based on whether the frequency band is allocated to the second wireless communication terminal.

In addition, when the physical frame is not received in the frequency band allocated to the second wireless communication terminal and before the set TXOP expires, the second wireless communication terminal may enter the sleep state.

In the embodiment of FIG. 25, the second station STA2 decodes the physical frame received through all channels used by the AP. The second station STA2 determines that the sub-channel having the 10 MHz bandwidth of the first Secondary Channel Secondary 1 and the second Secondary Channel Secondary 2 are allocated to the second station STA2. Thereafter, the second station STA2 stops decoding the physical frame received through the remaining frequency bands except for the sub-channel having the 10 MHz bandwidth of the first Secondary Channel Secondary 1 and the second Secondary Channel Secondary 2.

When the MSDU corresponding to the AC having a high priority is transmitted at the maximum speed as described in the embodiments of FIGS. 22 and 23, the same frequency band may be allocated to the plurality of second wireless communication terminals during one TXOP. In this case, the data reception operation of the second wireless communication terminal will be described with reference to FIGS. 26 and 27.

Figure 26:
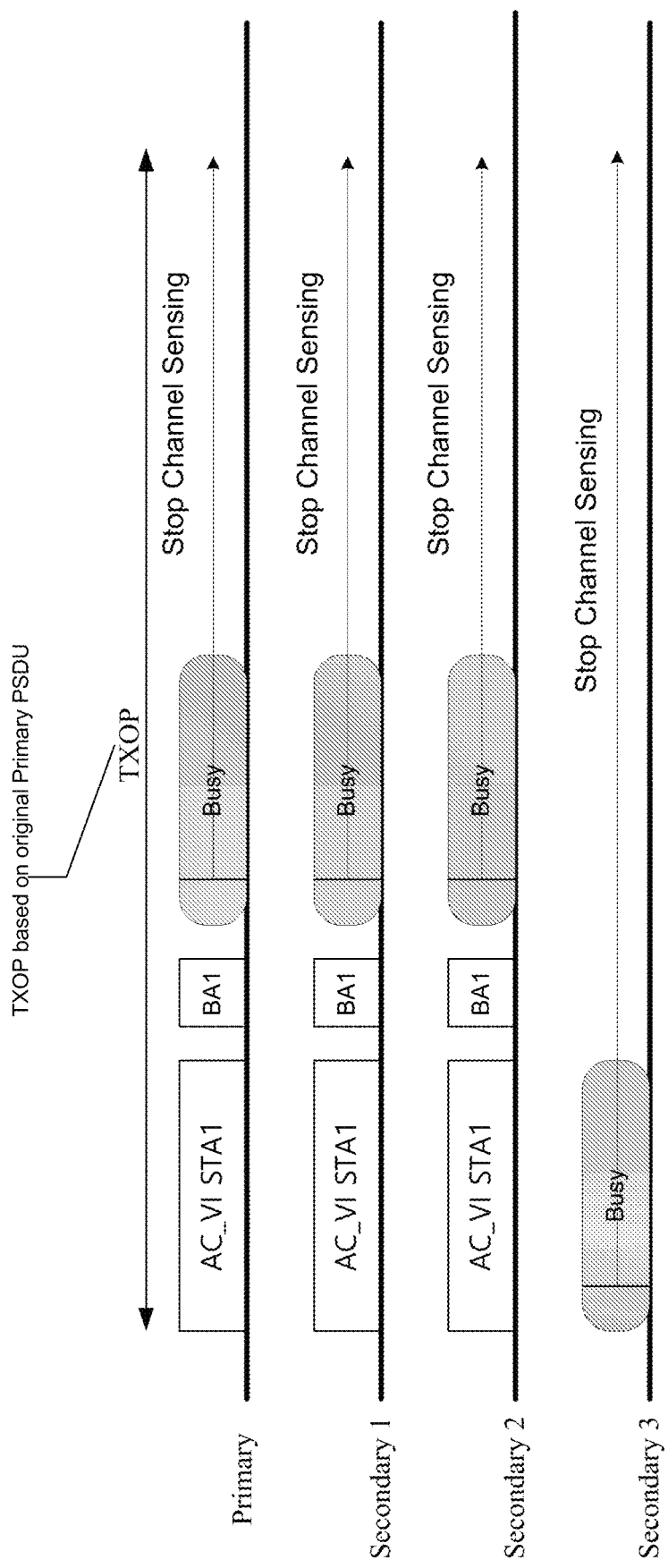
FIG. 26 is a view illustrating a data reception operation of a first station in the embodiment of FIG. 22 according to an embodiment of the present invention.
Figure 27:
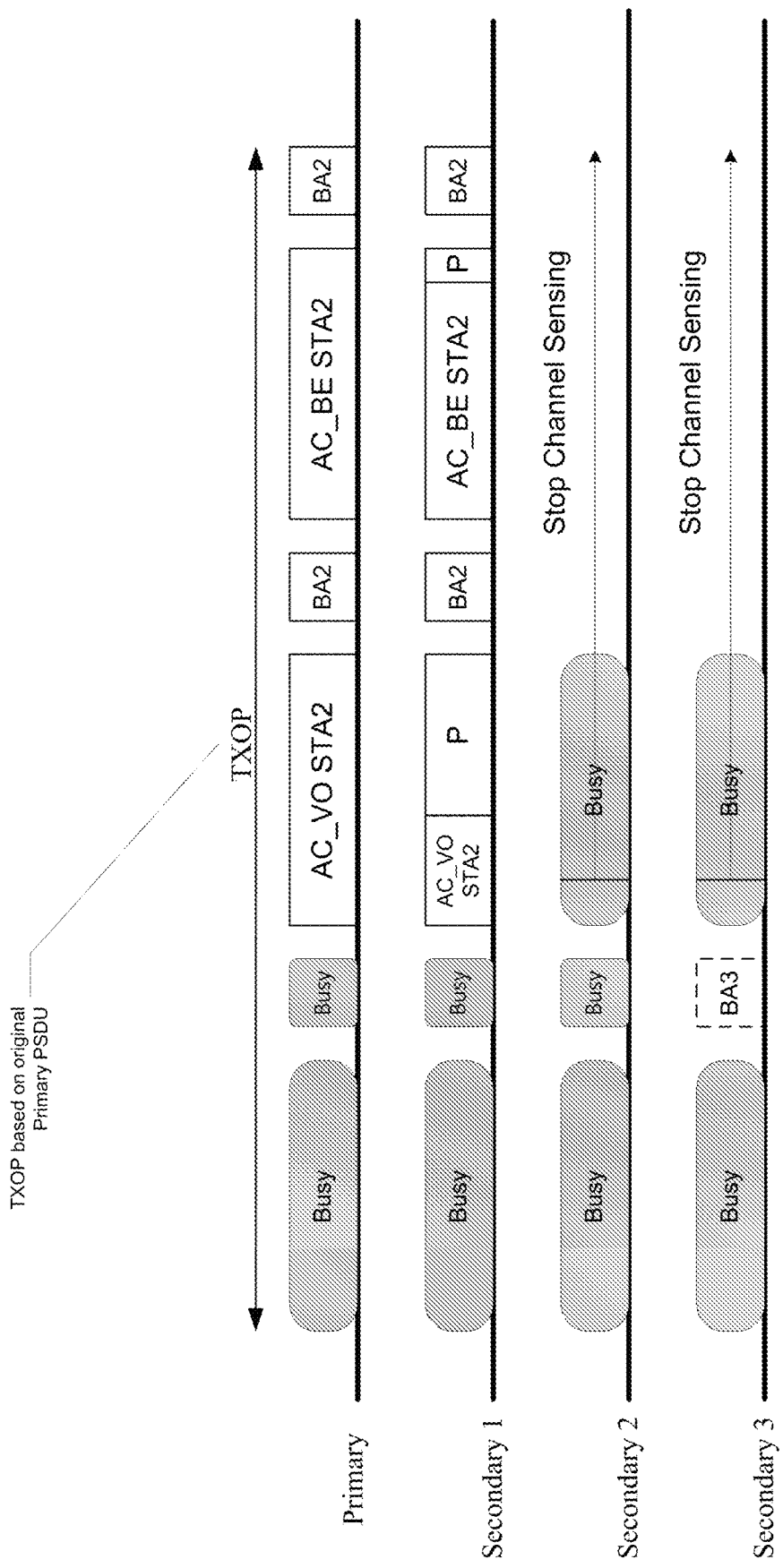
FIG. 27 is a view illustrating a data reception operation of a second station in the embodiment of FIG. 22 according to an embodiment of the present invention.

FIG. 26 is a view illustrating a data reception operation of a first station in the embodiment of FIG. 22 according to an embodiment of the present invention. FIG. 27 is a view illustrating a data reception operation of a second station in the embodiment of FIG. 22 according to an embodiment of the present invention.

As described above, the second wireless communication terminal may decode the physical frame coming in through the entire frequency band used by the first wireless communication terminal. In addition, when the physical frame is not received in the frequency band allocated to the second wireless communication terminal and before the set TXOP expires, the second wireless communication terminal may enter the sleep state.

However, if the first wireless communication terminal can allocate the same frequency band to a plurality of second wireless communication terminals during one TXOP, the second wireless communication terminal may not determine in which transmission time section the data is to be transmitted to the second wireless communication terminal through which frequency band. Therefore, the second wireless communication terminal should decode the physical frame transmitted in all the frequency bands.

In order to solve such a problem, the first wireless communication terminal may allocate a continuous transmission time section to the second wireless communication terminal. In addition, an additional frequency band may not be allocated after the transmission to the second wireless communication terminal is started. In this case, the second wireless communication terminal may determine a channel and a transmission interval allocated to the second wireless communication terminal when data transmission to the second wireless communication terminal is started or ended.

In the embodiment of FIG. 26, the first station STA1 decodes the physical frames received through the entire frequency band. The first station STA1 detects that the data transmitted in the first transmission section through the Primary Channel Primary, the first Secondary Channel Secondary 1, and the second Secondary Channel Secondary 2 is data for the first station STA1. The first station STA1 receives data through the Primary Channel Primary, the first Secondary Channel Secondary 1, and the second Secondary Channel Secondary 2. In addition, the first station STA1 detects that the data transmitted in the first transmission section through the third Secondary Channel Secondary 3 is not data for the first station STA1.

As in the above-described embodiment, the AP allocates a continuous transmission time section to a station and does not add a new frequency band after the transmission start time point. Therefore, the first station STA1 stops decoding the physical frame received through the third Secondary Channel Secondary 3.

In addition, the first station STA1 decodes the physical frame received in the second transmission section through the Primary Channel Primary, the first Secondary Channel Secondary 1, and the second Secondary Channel Secondary 2 and detects that the decoded physical frame is not a physical frame transmitted to the first station STA1. Accordingly, the first station STA1 stops decoding the physical frame received through the Primary Channel Primary, the first Secondary Channel Secondary 1, and the second Secondary Channel Secondary 2.

In the embodiment of FIG. 27, the second station STA2 decodes the physical frames received through the entire frequency band. The second station STA2 detects that the data transmitted in the first transmission section through the entire frequency band is not data for the second station STA2.

The second station STA2 detects that the data transmitted in the second transmission section through the Primary Channel Primary and the first Secondary Channel Secondary 2 is data for the second station STA2. The second station STA2 receives data through the Primary Channel Primary and the first secondary channel Secondary 1. In addition, the second station STA2 detects that the data transmitted in the second transmission section through the second Secondary Channel Secondary 2 and the third Secondary Channel Secondary 3 is not data for the second station STA2.

As described with reference to FIG. 26, the AP allocates a continuous transmission time section to a station and does not add a new frequency band after the transmission start time point. Therefore, the second station STA2 stops decoding the physical frame transmitted through the second Secondary Channel Secondary and the third Secondary Channel Secondary 3.

Figure 28:
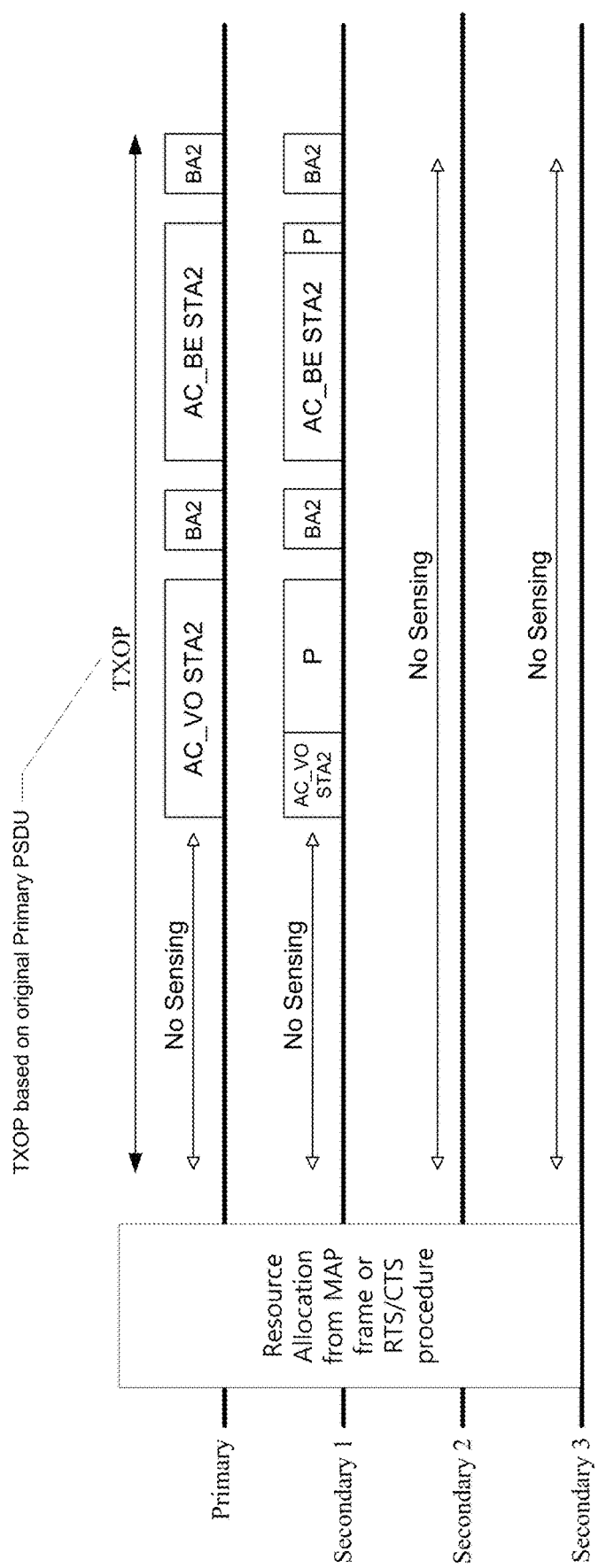
FIG. 28 is a view illustrating that a station, which receives a MAC frame indicating frequency band allocation information and time allocation information described in the embodiment of FIGS. 19 to 21, operates according to an embodiment of the present invention.

FIG. 28 is a view illustrating that a station, which receives a MAC frame indicating frequency band allocation information and time allocation information described in the embodiment of FIGS. 19 to 21, operates according to an embodiment of the present invention.

In the embodiments described with reference to FIGS. 25 to 27, it is difficult for the second wireless communication terminal to determine at which time point the first wireless communication terminal transmits data through which frequency band. Therefore, the second wireless communication terminal should receive the physical frame transmitted through several frequency bands.

When receiving the above-described frequency band allocation information and time allocation information, the second wireless communication terminal may decode only the physical frame received through the frequency band allocated to the second wireless communication terminal during the time section allocated to the second wireless communication terminal. In addition, the second wireless communication terminal may maintain the sleep state during the TXOP except for the time section allocated to the second wireless communication terminal.

In the embodiment of FIG. 28, the AP transmits a frame indicating frequency band allocation information and time allocation information. At this time, the frame indicating frequency band allocation information and time allocation information may be the MAP frame described above. In another specific embodiment, the frame indicating frequency band allocation information and time allocation information may be an RTS frame.

The second station STA2 decodes the physical frame transmitted through the Primary Channel Primary and the first Secondary Channel, which are the frequency bands allocated to the second station STA2, during the transmission time section allocated to the second station STA2.

The second station STA2 may maintain the sleep state in a transmission time section except for the transmission time section allocated to the second station STA2.

In addition, the second station STA2 does not decode the physical frame transmitted through a frequency band except for the Primary Channel Primary and the first Secondary Channel allocated to the second station STA2.

The second wireless communication terminal may reduce the operation of decoding the physical frame through the embodiment of FIG. 28. Therefore, the second wireless communication terminal may increase the energy efficiency through the embodiment of FIG. 28.

Figure 29:
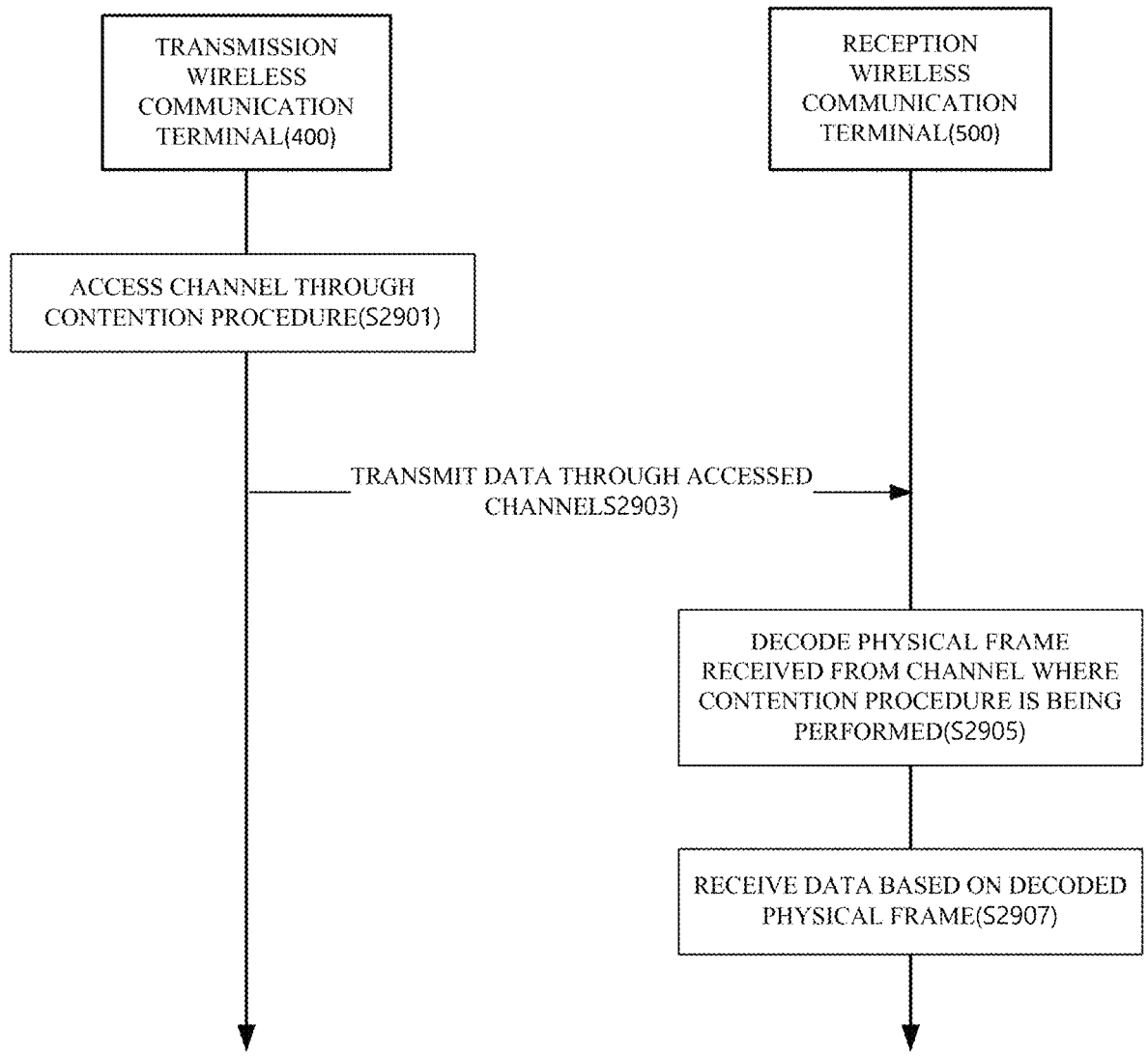
FIG. 29 is a ladder diagram illustrating a data transmission operation between wireless communication terminals according to an embodiment of the present invention.

FIG. 29 is a ladder diagram illustrating a data transmission operation between wireless communication terminals according to an embodiment of the present invention.

For convenience of description, a wireless communication terminal that transmits data according to an embodiment of the present invention is referred to as a transmission wireless communication terminal 400, and a wireless communication terminal that receives data according to an embodiment of the present invention is referred to as a reception wireless communication terminal 500.

The transmission wireless communication terminal 400 accesses a channel through a contention procedure (S2901). Specifically, the transmission wireless communication terminal 400 may perform a contention procedure on each of a plurality of channels, and may access at least one of the plurality of channels based on a contention procedure. Specifically, the transmission wireless communication terminal 400 may access a channel won by a contention procedure in each of a plurality of channels. At this time, the contention procedure may select a random value within the CW value and indicate that the corresponding channel is accessed when the corresponding channel is idle by the selected random value.

As described with reference to FIGS. 6 to 15, the transmission wireless communication terminal 400 may perform a contention procedure on all channels that the transmission wireless communication terminal 400 can use. At this time, all channels that the transmission wireless communication terminals 400 can use may represent all channels in BSS. In addition, the transmission wireless communication terminal 400 may perform a contention procedure on some of the channels that the transmission wireless communication terminal 400 can use. Specifically, the transmission wireless communication terminal 400 may perform a contention procedure on the Primary Channel and the APCH described with reference to FIG. 12 to FIG. 13.

The transmission wireless communication terminal 400 may transmit information on the frequency band that the transmission wireless communication terminal 400 uses for data transmission to the reception wireless communication terminal 500. Specifically, information on a frequency band used for data transmission may be transmitted according to the embodiments described with reference to FIG. 14, FIG. 15, and FIG. 17.

Specifically, the transmission wireless communication terminal 400 may transmit information indicating the number of a plurality of channels performing a contention procedure to the reception wireless communication terminal 500. In addition, the transmission wireless communication terminal 400 may transmit information indicating the locations of a plurality of channels performing a contention procedure to the reception wireless communication terminal 500.

The transmission wireless communication terminal 400 may apply the CW of the same size to a contention procedure performed in each of a plurality of channels performing a contention procedure. At this time, the transmission wireless communication terminal 400 may apply the same random value to a contention procedure performed in each of a plurality of channels performing a contention procedure. In another specific embodiment, the transmission wireless communication terminal 400 may independently select a random value in each of the plurality of channels, and may apply the independently selected random value to each of a plurality of contention procedures performed in the plurality of channels, respectively.

The plurality of channels through which the transmission wireless communication terminal 400 performs the contention procedure may not be contiguous to each other.

In addition, the first channel and the second channel may be contiguous and may access the first channel through a contention procedure, and if the second channel is idle for a predetermined time or more, the transmission wireless communication terminal 400 may access the second channel. At this time, the third channel may be contiguous to the second channel and may access the first channel through a contention procedure, and if the second channel and the third channel are idle for a predetermined time or more, the transmission wireless communication terminal 400 may access the third channel.

The transmission wireless communication terminal 400 transmits data through the accessed channel (S2903). At this time, the transmission wireless communication terminal 400 may allocate a frequency band and a transmission time section used for data transmission depending on the priority according to the type of data. Specifically, as described through the embodiments of FIGS. 16 to 28, a frequency band and a transmission time section used for data transmission may be allocated. At this time, the type of data may be the AC described above.

Specifically, the transmission wireless communication terminal 400 may set a time section where the transmission wireless communication terminal 400 can use a wireless medium through the embodiments described with reference to FIG. 16 to FIG. 18. The time section where the wireless medium can be used may be the TXOP described above.

In a specific embodiment, the transmission wireless communication terminal 400 sets a time section where the transmission wireless communication terminal 400 can use a wireless medium based on data having the highest priority among the data.

In another specific embodiment, the transmission wireless communication terminal 400 sets a time section where a wireless communication terminal can use a wireless medium based on the wireless communication terminal receiving data having the highest priority among the data transmitted by the transmission wireless communication terminal 400.

The transmission wireless communication terminal 400 may transmit the transmission ready frame described above and receive the reception ready frame to set NAV to the surrounding wireless communication terminal.

The transmission wireless communication terminal 400 may transmit first information indicating a frequency band allocated to each of a plurality of wireless communication terminals and second information indicating a time section where each of the plurality of wireless communication terminals receives data. Specifically, the transmission wireless communication terminal 400 may transmit the MAP frame described above. At this time, the MAP frame may be integrated with the RTS frame.

The reception wireless communication terminal 500 decodes the physical frame received from the channel on which the contention procedure is performed (S2905). Specifically, the reception wireless communication terminal 500 may decode a physical frame received from a channel on which a contention procedure is performed, as in the embodiments described with reference to FIG. 25 to FIG. 28. In a specific embodiment, the reception wireless communication terminal 500 may decode the physical frame received from the channel on which the transmission wireless communication terminal 400 performs the contention procedure among all the channels available to the transmission wireless communication terminal 400.

Further, when the transmission wireless communication terminal 400 transmits first information indicating a frequency band allocated to each of a plurality of wireless communication terminals and second information indicating a time section where each of the plurality of wireless communication terminals receives data, the reception wireless communication terminal 500 may decode the physical frame transmitted through the frequency band allocated to the reception wireless communication terminal 500 in the transmission time section allocated to the reception wireless communication terminal 500.

Also, the reception wireless communication terminal 500 may enter the sleep state when there is no data transmitted to the reception wireless communication terminal 500. Specifically, the reception wireless communication terminal 500 may maintain the sleep state during the time except for the transmission time section allocated to the reception wireless communication terminal 500 in the TXOP.

The reception wireless communication terminal 500 receives data based on the decoded physical frame (S2907). In addition, the reception wireless communication terminal 500 may also transmit a reception completion frame to the transmission wireless communication terminal 400. At this time, the transmission wireless communication terminal 400 may retransmit data as in the embodiment described with reference to FIG. 20. Specifically, the transmission wireless communication terminal 400 may retransmit data to a wireless communication terminal that does not transmit the reception complete frame.

In addition, if failing to receive data in the transmission time section allocated to the reception communication wireless terminal 400, the reception wireless communication terminal 400 may transmit a retransmission request to the transmission wireless communication terminal 500.

Although some specific embodiments of the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the spirit and scope of the present invention. For example, each component specifically shown in the embodiments may be modified and implemented. It should be interpreted that differences relating to such modifications and application are included in the scope of the present invention defined in the appended claims.

The invention claimed is:

1. A wireless communication terminal comprising:
a transceiver; and
a processor,
wherein the processor performs respective contention procedures in a plurality of channels in an unlicensed band, and performs, by using the transceiver, transmission in a first channel of the plurality of channels based on a contention procedure in the first channel and transmission in a second channel of the plurality of channels based on a contention procedure in the second channel,
wherein the contention procedure in the first channel and the contention procedure in the second channel are performed independently of each other,
wherein the contention procedure in the first channel is a contention procedure based on a random backoff.

2. The wireless communication terminal of claim 1, wherein the processor starts the contention procedure of the first channel and the contention procedure of the second channel at the same time.

3. The wireless communication terminal of claim 2, wherein the processor applies the same value, to a back-off counter of the contention procedure of the first channel, as a value of a back-off counter of the contention procedure of the second channel.

4. The wireless communication terminal of claim 1, wherein the first channel is not contiguous to the second channel.

5. The wireless communication terminal of claim 1, wherein the processor, by using transceiver, transmits information indicating the number of the plurality of channels.

6. The wireless communication terminal of claim 1, wherein the processor, by using transceiver, transmits information indicating locations of the plurality of channels.

7. A method of operating a wireless communication terminal, the method comprising:
- performing respective contention procedures in a plurality of channels in an unlicensed band; and
- performing transmission in a first channel of the plurality of channels based on a contention procedure in the first channel and transmission in a second channel of the plurality of channels based on a contention procedure in the second channel,
- wherein the contention procedure in the first channel and the contention procedure in the second channel are performed independently of each other,
- wherein the contention procedure in the first channel is a contention procedure based on a random backoff.

8. The method of claim 7, wherein the performing the contention procedure further comprises starting the contention procedure of the first channel and the contention procedure of the second channel at the same time.

9. The method of claim 8, wherein the performing the contention procedure further comprises applying the same value to back-off counter of the contention procedure of the first channel as a value of a back-off counter of the contention procedure of the second channel.

10. The method of claim 7, wherein the first channel is not contiguous to the second channel.

11. The method of claim 7, wherein the method further comprises transmitting information indicating the number of the plurality of channels.

12. The method of claim 7, wherein the method further comprises transmitting information indicating locations of the plurality of channels.

13. A wireless communication terminal comprising:
- a transceiver; and
- a processor,
- wherein the processor receives a transmission,
- wherein the transmission is transmitted based on a channel access method,
- wherein the channel access method comprising:
- performing respective contention procedures in a plurality of channels in an unlicensed band; and
- performing transmission in a first channel of the plurality of channels based on a contention procedure in the first channel and transmission in a second channel of the plurality of channels based on a contention procedure in the second channel,
- wherein the contention procedure in the first channel and the contention procedure in the second channel are performed independently of each other,
- wherein the contention procedure in the first channel is a contention procedure based on a random backoff.

* * * * *